United States Patent
Boyle et al.

(10) Patent No.: US 9,253,376 B2
(45) Date of Patent: *Feb. 2, 2016

(54) PORTABLE VIDEO RECORDING SYSTEM WITH AUTOMATIC CAMERA ORIENTING AND VELOCITY REGULATION OF THE ORIENTING FOR RECORDING HIGH QUALITY VIDEO OF A FREELY MOVING SUBJECT

(71) Applicant: H4 Engineering, Inc., San Antonio, TX (US)

(72) Inventors: Christopher T. Boyle, San Antonio, TX (US); Scott K. Taylor, San Antonio, TX (US); Alexander G. Sammons, San Antonio, TX (US); John T. O'Callaghan, San Antonio, TX (US); Denes Marton, San Antonio, TX (US)

(73) Assignee: H4 Engineering, Inc., San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/223,803

(22) Filed: Mar. 24, 2014

(65) Prior Publication Data
US 2014/0204230 A1    Jul. 24, 2014

Related U.S. Application Data

(63) Continuation of application No. 13/726,203, filed on Dec. 23, 2012, now Pat. No. 8,704,904.

(60) Provisional application No. 61/745,346, filed on Dec. 21, 2012, provisional application No. 61/580,084,
(Continued)

(51) Int. Cl.
| | |
|---|---|
| *H04N 5/232* | (2006.01) |
| *H04N 5/222* | (2006.01) |
| *G06F 3/033* | (2013.01) |

(52) U.S. Cl.
CPC ............ *H04N 5/222* (2013.01); *G06F 3/033* (2013.01); *H04N 5/23203* (2013.01); *H04N 5/23258* (2013.01)

(58) Field of Classification Search
CPC .................................................. H04N 5/23203
USPC ............................................................ 348/169
See application file for complete search history.

(56) References Cited

U.S. PATENT DOCUMENTS

| | | |
|---|---|---|
| 3,469,148 A | 9/1969 | Lund |
| 4,041,507 A | 8/1977 | Chan et al. |

(Continued)

FOREIGN PATENT DOCUMENTS

| | | |
|---|---|---|
| EP | 0660131 A | 6/1995 |
| EP | 1981278 A1 | 10/2008 |

(Continued)

OTHER PUBLICATIONS

ECODRIVE03 Drive for General Automation With Fieldbus-Interface; 2000; Rexroth Indramat GmbH; pp. 224 and 278.*

(Continued)

*Primary Examiner* — Gary C Vieaux
(74) *Attorney, Agent, or Firm* — Volk & McElroy, LLP; Michael D. Volk, Jr.

(57) ABSTRACT

This invention relates to the automatic pointing of a pointing device, such as a camera, without the assistance of a person who operates the camera. Systems and methods are disclosed wherein the system is substantially stationary during recording but is portable to the venue of recording. For the purpose of recording, the camera turns automatically to optically follow the person, animal, or object that is being recorded. The present invention provides for high quality video recording; the high quality video recording here refers to features of the inventive systems and methods that provide for smooth camera motion necessary to take enjoyable videos for personal or for commercial use. This invention provides a portable system that automatically records videos from the vantage point of a sports fan, of a spectator or of a competition judge.

17 Claims, 11 Drawing Sheets

Related U.S. Application Data filed on Dec. 23, 2011, provisional application No. 61/580,093, filed on Dec. 23, 2011, provisional application No. 61/580,112, filed on Dec. 23, 2011, provisional application No. 61/580,115, filed on Dec. 23, 2011, provisional application No. 61/580,080, filed on Dec. 23, 2011, provisional application No. 61/580,101, filed on Dec. 23, 2011.

(56) References Cited

U.S. PATENT DOCUMENTS

| | | | |
|---|---|---|---|
| 4,153,357 A | 5/1979 | Winnacker et al. | |
| 4,244,591 A | 1/1981 | Umetsu | |
| 4,683,729 A | 8/1987 | Rogers | |
| 4,814,711 A | 3/1989 | Olsen et al. | |
| 4,980,871 A | 12/1990 | Sieber et al. | |
| 5,363,297 A | 11/1994 | Larson et al. | |
| 5,430,473 A | 7/1995 | Beecher, II et al. | |
| 5,447,278 A * | 9/1995 | Lalouette et al. | 242/335 |
| 5,457,370 A | 10/1995 | Edwards | |
| 5,463,432 A | 10/1995 | Kahn | |
| 5,491,632 A | 2/1996 | Pawlak et al. | |
| 5,572,317 A | 11/1996 | Parker et al. | |
| 5,640,007 A | 6/1997 | Talbott et al. | |
| 5,668,629 A | 9/1997 | Parker et al. | |
| 5,802,412 A | 9/1998 | Kahn | |
| 5,878,151 A | 3/1999 | Tang et al. | |
| 5,912,980 A | 6/1999 | Hunke | |
| 5,973,732 A | 10/1999 | Guthrie | |
| 6,002,428 A | 12/1999 | Matsumura et al. | |
| 6,014,167 A | 1/2000 | Suito et al. | |
| 6,031,568 A | 2/2000 | Wakitani | |
| 6,035,067 A | 3/2000 | Ponticos | |
| 6,075,557 A | 6/2000 | Holliman et al. | |
| 6,130,964 A | 10/2000 | Marques et al. | |
| 6,173,066 B1 | 1/2001 | Peurach et al. | |
| 6,188,777 B1 | 2/2001 | Darrell et al. | |
| 6,258,007 B1 * | 7/2001 | Kristjansson | 477/7 |
| 6,355,881 B1 | 3/2002 | Braeges et al. | |
| 6,519,860 B1 | 2/2003 | Bieg et al. | |
| 6,596,976 B2 | 7/2003 | Lin et al. | |
| 6,650,360 B1 | 11/2003 | Osen | |
| 6,690,978 B1 | 2/2004 | Kirsch | |
| 6,744,403 B2 | 6/2004 | Milnes et al. | |
| 6,751,409 B2 | 6/2004 | Nakamura | |
| 6,771,213 B2 | 8/2004 | Durst et al. | |
| 6,795,110 B1 | 9/2004 | Kossin | |
| 6,867,799 B2 | 3/2005 | Broemmelsiek | |
| 6,952,646 B2 | 10/2005 | Chang | |
| 6,972,787 B1 | 12/2005 | Allen et al. | |
| 7,050,712 B2 | 5/2006 | Shimamura | |
| 7,060,921 B2 | 6/2006 | Kubo | |
| 7,239,975 B2 | 7/2007 | Coleman et al. | |
| 7,245,251 B2 | 7/2007 | Vogel et al. | |
| 7,349,008 B2 | 3/2008 | Rui et al. | |
| 7,365,771 B2 | 4/2008 | Kahn et al. | |
| 7,426,338 B2 | 9/2008 | Matsumoto et al. | |
| 7,450,835 B2 | 11/2008 | Lackey et al. | |
| 7,477,839 B2 | 1/2009 | Funahashi et al. | |
| 7,547,875 B1 | 6/2009 | Tsai et al. | |
| 7,557,825 B2 | 7/2009 | Ishii et al. | |
| 7,591,195 B2 | 9/2009 | Puzio | |
| 7,672,781 B2 | 3/2010 | Churchill et al. | |
| 7,751,696 B2 | 7/2010 | Tatamiya | |
| 7,855,638 B2 | 12/2010 | Huston | |
| 7,920,163 B1 | 4/2011 | Kossin | |
| 8,100,591 B2 * | 1/2012 | Chapman et al. | 396/428 |
| D684,210 S | 6/2013 | Boyle et al. | |
| 8,473,103 B2 * | 6/2013 | Tsai et al. | 700/254 |
| D703,719 S | 4/2014 | Boyle et al. | |
| 8,704,904 B2 | 4/2014 | Boyle et al. | |
| D704,762 S | 5/2014 | Boyle et al. | |
| 8,953,117 B2 | 2/2015 | Rosenau et al. | |
| 2001/0030856 A1 | 10/2001 | Wilson | |
| 2002/0005902 A1 | 1/2002 | Yuen | |
| 2002/0057217 A1 | 5/2002 | Milnes et al. | |
| 2002/0149681 A1 | 10/2002 | Kahn et al. | |
| 2003/0025614 A1 | 2/2003 | Kahn | |
| 2004/0006424 A1 | 1/2004 | Joyce et al. | |
| 2004/0105010 A1 | 6/2004 | Osen | |
| 2004/0119716 A1 | 6/2004 | Park et al. | |
| 2005/0014458 A1 | 1/2005 | Hung | |
| 2005/0083433 A1 | 4/2005 | Wishart et al. | |
| 2005/0134458 A1 | 6/2005 | Leyden et al. | |
| 2005/0174084 A1 | 8/2005 | Nakai et al. | |
| 2005/0220448 A1 | 10/2005 | Tei et al. | |
| 2006/0045613 A1 | 3/2006 | Leyden et al. | |
| 2006/0077258 A1 | 4/2006 | Allen et al. | |
| 2007/0019073 A1 | 1/2007 | Comaniciu et al. | |
| 2007/0146484 A1 | 6/2007 | Horton et al. | |
| 2007/0164905 A1 | 7/2007 | Lempkowski et al. | |
| 2007/0292118 A1 | 12/2007 | Traff | |
| 2008/0001022 A1 | 1/2008 | Sa et al. | |
| 2008/0002031 A1 | 1/2008 | Cana et al. | |
| 2008/0015000 A1 | 1/2008 | Jung | |
| 2008/0062711 A1 | 3/2008 | Veenstra et al. | |
| 2008/0105527 A1 | 5/2008 | Leftly | |
| 2008/0192116 A1 | 8/2008 | Tamir et al. | |
| 2008/0225137 A1 | 9/2008 | Kubo et al. | |
| 2008/0253140 A1 | 10/2008 | Fleischmann et al. | |
| 2008/0271220 A1 | 11/2008 | Chilton et al. | |
| 2009/0028386 A1 | 1/2009 | Michimoto et al. | |
| 2009/0096871 A1 | 4/2009 | Kuwano et al. | |
| 2009/0145371 A1 | 6/2009 | Kramer | |
| 2009/0154182 A1 | 6/2009 | Veenstra et al. | |
| 2009/0167867 A1 | 7/2009 | Lin et al. | |
| 2009/0206077 A1 | 8/2009 | Melmon et al. | |
| 2009/0267895 A1 | 10/2009 | Bunch | |
| 2010/0026809 A1 | 2/2010 | Curry | |
| 2010/0030856 A1 | 2/2010 | Blum et al. | |
| 2010/0118149 A1 | 5/2010 | Levin et al. | |
| 2010/0186214 A1 | 7/2010 | Judge | |
| 2010/0191651 A1 | 7/2010 | Irmscher et al. | |
| 2010/0238262 A1 | 9/2010 | Kurtz et al. | |
| 2010/0245532 A1 | 9/2010 | Kurtz et al. | |
| 2011/0050878 A1 | 3/2011 | Wells et al. | |
| 2011/0109554 A1 | 5/2011 | Boissier | |
| 2011/0187865 A1 | 8/2011 | Felt et al. | |
| 2011/0211820 A1 | 9/2011 | Yim | |
| 2011/0228098 A1 | 9/2011 | Lamb et al. | |
| 2012/0112347 A1 | 5/2012 | Eckhardt et al. | |
| 2012/0169865 A1 | 7/2012 | Tsai | |
| 2012/0218415 A1 | 8/2012 | Chun et al. | |
| 2012/0262618 A1 | 10/2012 | Weakly | |
| 2012/0269386 A1 | 10/2012 | Hankins et al. | |
| 2012/0321294 A1 | 12/2012 | Tages et al. | |
| 2013/0016960 A1 | 1/2013 | Yang | |
| 2013/0077931 A1 | 3/2013 | Cornell et al. | |
| 2013/0162852 A1 | 6/2013 | Boyle et al. | |
| 2013/0230293 A1 | 9/2013 | Boyle et al. | |
| 2013/0242080 A1 | 9/2013 | Kossin | |
| 2013/0242105 A1 | 9/2013 | Boyle et al. | |
| 2013/0278845 A1 | 10/2013 | Pishnyak et al. | |
| 2014/0152890 A1 | 6/2014 | Rayner | |
| 2014/0226062 A1 | 8/2014 | Parrill | |

FOREIGN PATENT DOCUMENTS

| | | | |
|---|---|---|---|
| JP | 2005020205 A | | 1/2005 |
| JP | 2007312026 | | 11/2007 |
| KR | 1019980043069 A | | 8/1998 |
| WO | 9517687 A | | 6/1995 |
| WO | 0141428 A1 | | 6/2001 |
| WO | 2008037127 A1 | | 4/2008 |

OTHER PUBLICATIONS

Barwani et al., Vehicle Dynamics Lab GPS Tracking Camera Turret, web site, 2009, available at URL http://www.me.berkeley.edu/ME102B/Past_Proj/f09/17%20GPS%20Camera%20Turret%20Website/Home.html.

(56) References Cited

OTHER PUBLICATIONS

Clifford et al., Measuring Tilt with Low-g Accelerometers, Freescale Semiconductor Application Note, May 2005, Freescale Semiconductor, available at URL http://classes.cecs.ucf.edu/seecsseniordesign/su2006fa2006/g09/files/patrick/measuring%20tilt%20with%20low-g%20accelerometers.pdf.

Dana M. Sommer, Principles of GPS, Presentation Slides, date of publication unknown, available at URL des.memphis.edu/esra/.../Principles%20of%20GPS%204-13-04.pdf.

E. Calais, The Global Positioning System, Presentation Slides, available at date of publication unknown, available at URL web.ics.purdue.edu/~ecalais/teaching/geodesy/GPS_observables.pdf.

Gibbings et al., Assessing the Accuracy and Integrity of RTK GPS Beneath High Voltage Power Lines, 2001—A Spatial Odyssey: 42nd Australian Surveyors Congress, date of publication unknown, available at URL eprints.usq.edu.au/2606/1/gibbings.pdf.

Kaplan et al., Understanding GPS Principles and Applications, book, 2006, Artech House, available at URL http://www.bdu.ac.in/ckr/uploads/Earth/GPS%20FULL%20All%20in%20in%201.pdf.

Kimberly Tuck, Tilt Sensing Using Linear Accelerometers, Freescale Semiconductor Application Note, Jun. 2007, Freescale Semiconductor, available at URL http://www.mh-hannover.de/fileadmin/zentrale_einrichtungen/zentrale_forschungswerkst/downloads/AN3461.pdf.

Oncore, Chapter 2 GPS Principles, date of publication unknown, available at URL gpsd.berlios.de/vendor-docs/motorola/ch2.pdf.

Dr. Jacob Tal, Motion Control Made Easy, PT Design, p. 62, 64 (Oct. 2000).

* cited by examiner

PORTABLE VIDEO RECORDING SYSTEM WITH AUTOMATIC CAMERA ORIENTING AND VELOCITY REGULATION OF THE ORIENTING FOR RECORDING HIGH QUALITY VIDEO OF A FREELY MOVING SUBJECT

CROSS-REFERENCE TO RELATED APPLICATIONS

This application is a continuation of U.S. patent application Ser. No. 13/726,203, filed Dec. 23, 2012, titled "Portable System for High Quality Video Recording", which application claims the benefit of U.S. Provisional Patent Application No. 61/580,080, filed Dec. 23, 2011; U.S. Provisional Patent Application No. 61/580,084, filed Dec. 23, 2011; U.S. Provisional Patent Application No. 61/580,093, filed Dec. 23, 2011; U.S. Provisional Patent Application No. 61/580,101, filed Dec. 23, 2011; U.S. Provisional Patent Application No. 61/580,112, filed Dec. 23, 2011; U.S. Provisional Patent Application No. 61/580,115, filed Dec. 23, 2011 and U.S. Provisional Patent Application No. 61/745,346, filed Dec. 21, 2012, the contents all of which are incorporated herein by this reference and are not admitted to be prior art with respect to the present invention by the mention in this cross-reference section.

BACKGROUND

Recording a person participating in an activity is an important task. A surfer may wish to capture his surfing experience for later enjoyment or to improve his or her surfing technique. A father may wish to record his son's winning touchdown in a football game. A mother may wish to capture her daughter's record-breaking gymnastics performance. In these examples, the camera is typically, and sometimes for best results, relatively far away from the participant, or more generally, the subject. To record the subject, a second person is needed to control and position the camera. Because humans are imperfect, the quality of the recorded video may not be ideal. For example, the camera operator or cameraman may have an unsteady hand making the recorded video too shaky and unbearable to watch. Additionally, the cameraman may become tired or distracted and may not keep the subject in the view field of the camera. In this situation, the cameraman may fail to capture an exciting or interesting moment. Further, some subjects may not have a second person willing to operate the camera. In this case, the individual loses the chance to record him or herself.

SUMMARY OF THE INVENTION

In accordance with a preferred embodiment hereof, this invention provides a portable system for automated orientation of a camera to point at a freely moving target, such system comprising a positioner to orient the camera; a remote unit that obtains location information; and a base station configured to command the positioner to orient the camera at the freely moving target and to regulate the velocity of the orienting; wherein the base station comprises a receiver to receive the location information from the remote unit; wherein location information received by the base station when the remote unit is collocated with the camera is stored and used as the location of the camera by the base station; and wherein the base station commands the positioner to orient the camera at the freely moving target using location information received from the remote unit when the remote unit is collocated with the freely moving target and the location of the camera received by the base station when the remote unit is collocated with the camera.

In accordance with another preferred embodiment hereof, this invention provides a method of automatically following a freely moving target with a camera, such method comprising the steps of setting up a camera associated with a positioning device wherein the positioning device is capable of receiving commands to orient the camera; collocating a remote unit that obtains location information with the camera and storing location information obtained as the location of the camera; moving the remote unit to a location away from the camera such that the remote unit is at or near the center of the field of view of the camera; determining the initial pointing angle of the camera using the stored location of the camera and the stored location of the remote unit; periodically receiving signals relevant to the location of the remote unit as the remote unit is associated with the freely moving target and transmitting information related to the location of the remote unit to the positioning device; periodically determining turning angle and velocity values for orienting the camera to remain pointed at the remote unit based in part on the initial pointing angle of the camera; and commanding the positioning device to orient the camera based on the determined turning angle and velocity values.

In accordance with yet another preferred embodiment hereof, this invention provides a system comprising a first component sized so as to be portable and stationary when the first component is assembled for use; the first component connectable with a camera, wherein the camera, when connected, is turnable; a second component that is associated with a recording subject; wherein the first component comprises a receiver to receive information regarding the location of the first component and the location of the second component; wherein the first component turns the camera using location information received by the receiver such that the camera optically follows the subject moving to different locations and wherein the first component turns the camera around at least one axis based at least in part on the velocity of the subject.

This invention also provides each and every novel feature, element, combination, step, and/or method disclosed or suggested herein.

DETAILED DESCRIPTION OF THE INVENTION

Figure 1:
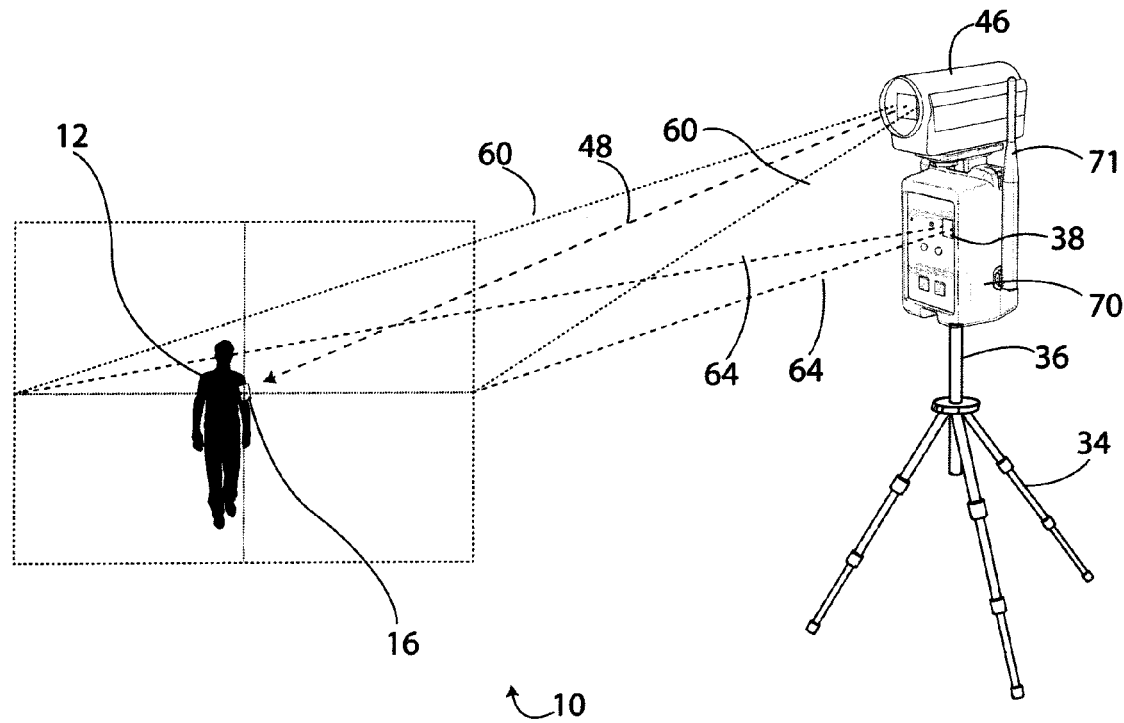
FIG. 1 shows an overview of the automatic recording system according to a preferred embodiment of the present invention.

The present invention relates to systems and methods of automatically orienting a pointing device (also called a directional device or pointer) such as a camera. More particularly, the present invention relates to a system and method that automatically orients a directional device, such as a camera, based on receiving periodic updates of location information of a freely moving subject and converting the location information into commands that change the orientation of the directional device such that the directional device substantially points at the subject. It is noted that the subject may be human, animal, or an object.

In a preferred embodiment, the system controls the velocity of orientation changes in order to point the pointer at the subject in a smooth and controlled way. Controlling the acceleration—generally speaking, the time derivatives of velocity—is considered to be encompassed by the concept of controlling velocity.

In a preferred embodiment the pointing device is a camera and the system may be used for automatic video recording of a freely moving subject. Controlling velocity is particularly useful in such an embodiment because it helps to produce high quality video recordings without jerky camera artifacts.

A preferred embodiment of the present invention relates to systems and methods of automatically pointing a device, such as a camera, at a freely moving subject using location coordinates based on transmissions received from satellite-based and/or earth-based transmitters.

One major advantage of the systems and methods of the present invention is the ability to record a freely moving subject automatically without the need for a person to handle the camera. Another major advantage of the present invention is the ability to produce video recordings of a subject's activity from the perspective of a spectator, a competition judge, fans, etc., without engaging the services of a cameraman. The systems and methods of the present invention may be used to memorialize countless activities such as surfing, kiteboarding, skateboarding, motocross racing, golfing, playing soccer, playing tennis, snowboarding, skiing, studying animal behavior, dramatic arts, weddings, concerts, birthday parties, etc. Additionally, a plurality of devices embodying the inventive systems and methods hereof may be set up at locations of interest to record multiple subjects engaged in an activity. The video recorded in such a scenario may then be processed to combine the footage of the activity participants.

The process of generating recorded images, or a recorded image series, that may be played back and viewed and that, for the viewer, appears either as a continuous motion picture, or as a series of photographs, is generally referred to as video recording, videotaping, filming, etc. It is noted that these terms apply to such a process without regard to the actual recording device, its type of memory, recording medium, or means of recording, and further without regard to whether the images are actually saved or not.

Automatic recording by a camera of a person engaged in an activity (or, more generally, an object moving around without a predetermined path) is a complex task. Such a task requires an initialization where the pointing direction of the camera, the location of the camera and the location of the subject become known in absolute terms and or relative to one another; the camera must be oriented such that it initially points substantially at the subject. Next, the camera orientation must be updated in a controlled manner such that the camera continues to substantially point at the subject in real time or near real time as the subject changes locations. The camera movements should be made in a way that the resulting recording will be enjoyable for viewers. The "enjoyability" will be referred to herein as "high quality video recording" (HQVR). High quality video recording relates to the way camera motion is handled and not necessarily to the qualities of the camera (i.e., camera resolution, quality of the camera optics, or adjustability of parameters including lens aperture, focus and zoom).

There are at least two main components that contribute to high quality video recording: 1) the precision with which the camera is oriented (i.e., keeping the subject well positioned within the shot) and 2) the smoothness of the camera motion during filming (i.e., avoiding unnecessary jerkiness, jumpiness, vibration, etc.). Using the systems and methods of the present invention will result in high quality video recording.

A preferred embodiment of the present invention comprises of one or more devices that receive signals from a constellation of satellites that are parts of a Global Positioning System (sometimes referred to herein as "GPS"). The GPS signals are registered by the device or devices and the location coordinates of one or more system components are determined. In most uses, "GPS" refers to the Global Positioning System maintained by the United States Department of Defense. It is noted that the systems and methods of the present invention may be used with signals received from other and/or multiple satellite-based positioning systems, partially terrestrial positioning systems, or fully terrestrial positioning systems. As will be discussed further herein, appropriately located GPS units will generate location coordinates of the subject to be recorded and of the camera that does the recording.

A preferred embodiment of the invention also includes devices that receive location data or correction factors from GPS units and transmit the received data to different parts of the automatic recording system and/or receive the signals from another transmitting unit. These devices are also sometimes referred to by the acronym UART (Universal Asynchronous Receiver/Transmitter). These devices will be referred to herein as transceivers.

A preferred embodiment of the present invention also includes one or more devices that receive a plurality of location data, as well as other information regarding current and past camera direction. These devices include central processing units (CPU) or microcontroller units (MCU). The CPU and/or MCU generate instructions, based on the location data and other information, for a positioner to point an associated camera in the direction of a subject.

As discussed further herein, the positioner preferably comprises one or more motors to orient an associated camera such that a given frame recorded includes the subject. Further, the motor or motors that move the camera are preferably equipped with one or more encoded wheels (together with the necessary light sources and sensors) employed to make the camera positioning and motor movements sufficiently precise.

A high degree of precision of camera movements is essential for the appropriate control of both the camera orientation and the camera movement velocity as the camera moves. The systems and methods of the present invention make camera movements classified as HQVR using instructions that mimic movements that would be imparted to the camera by a highly skilled cameraman. In that regard, movement of the subject detected by a GPS unit and transmitted to a CPU is considered "movement" only when the subject moves beyond a predetermined distance from the center of the camera view. In other words, a "deadband" within which movements of the subject are detected but do not result in movement of the camera is included in the systems and methods of the present invention. Utilization of a deadband contributes to high quality video recording.

The acceleration/deceleration and movement speed of the camera are controlled when the movements of the subject are outside of the deadband by the systems and methods of the present invention. When the camera moves, the goal is to keep the subject substantially within the recording frame. A preferred embodiment of the present invention includes camera movement controls for the camera movement speed that cause the camera initially to accelerate quickly but smoothly and then to slow when the camera approaches the pointing direction of the subject. A preferred embodiment of the present invention also comprises systems and methods to compensate for inherent system lag between the time a subject changes location in real time and the delayed time in which the camera orientation begins to change in response to the detected subject location change.

In addition, a preferred embodiment of the present invention accounts for the possibility that GPS location data may be missing (for example, due to a communication error between the GPS satellites and the GPS sensor or between parts of the inventive system). The systems and methods of the present invention ignore brief periods of data loss. When the data loss exceeds a preset time limit, the camera either stays in place or returns to the last known position of the subject.

A preferred embodiment of the present invention automatically controls camera orientations as well as the functions of the camera (e.g., camera zoom level). For example, if location coordinates from the remote device are missing for some period of time, the camera may be instructed to zoom out to increase the probability of retaining the subject in the camera view until receipt of location data resumes. In some embodiments of the invention, control of the zoom feature of the camera is employed by the system as a method to keep the subject inside the frame when the subject moves fast.

The above-noted features are implemented in various embodiments of the systems and methods of the present invention. A discussion of the accompanying figures and specific embodiments of the systems and methods of the present invention follows.

FIG. 1 shows automatic recording system 10, one preferred embodiment of an automatic pointing system. Automatic recording system 10 is preferably configured to detect the location of and track subject 12. As discussed above, subject 12 may be, for example, a participant in a sporting event. It is noted that the subject to be tracked and recorded by automatic recording system 10 may also be an animal or an object.

Automatic recording system 10 preferably includes remote device 16 (which may also be referred to herein as remote unit 16). Remote device 16 is preferably a wearable element that may be temporarily secured to the subject. According to one preferred embodiment hereof, the remote device preferably comprises a housing or enclosure for necessary electronic components and a means to secure the housing to subject 12. According to a preferred embodiment, a strap system is used to secure the remote unit 16 to subject 12 during use. According to other preferred embodiments, the remote unit 16 is secured to the subject 12 through other means such as a clasp, mount, pouch, or suction cup. To track the subject, the subject must be co-located with the remote device or in a known location relative to the remote device 16. According to a preferred embodiment hereof, the subject 12 and remote device 16 may be co-located by strapping the remote device 16 to the subject 12.

As shown in FIG. 1, the subject wears the remote device on his or her arm. The remote device 16 may be connected to other portions of the subject's body, apparel, or equipment used in performing the activity to be recorded. For example, in a surfing scenario, the remote device may be connected with a surfboard and not necessarily to the human, object, or animal riding the surfboard. For convenience, subject 12 together with associated remote device 16 will be referred to as the target.

Automatic recording system 10 further comprises orientation controller 70. Orientation controller 70 is preferably sized to be portable. For example, orientation controller 70 may have a height of about five inches, a width of about three inches, and a depth of about three inches. These exemplary dimensions permit orientation controller to be conveniently stored in, for example, an airline carry-on travel bag. Such dimensions may be altered to make the orientation controller smaller or even larger so long as the device may be ported easily from location to location. The components which connect with orientation controller 70 are also similarly portable.

Camera 46 is preferably connected to orientation controller 70, as shown. Camera 46 may be a video camera, a still photograph camera, a smart phone, a tablet computing device, or any other attachable recording device. Orientation controller 70 is preferably mounted on tripod 34 (embodying herein a stand to support the positioner). In the embodiment shown in FIG. 1, tripod 34 comprises upwardly extending mast 36. Orientation controller 70 is preferably connected to mast 36 of tripod 34. It is noted that there are a variety of tripods in the marketplace. Orientation controller 70 is preferably designed to engage the typical connection interfaces of tripods. In another embodiment, the tripod 34 is replaced by other means for providing a portable platform capable of being temporarily fixed relative to earth such as, for example, a weighted block, a mounting strap such as to mount orientation controller 70 to a fixed object like a pole or bar, or a suction cup. In still other embodiments the pointing device (a camera, for example) is an integral component of orientation controller 70.

When orientation controller 70 is set up, camera 46 points along relative position pointing vector 48 as depicted. The zoom level of camera 46 is preferably set such that subject 12 is sufficiently within the field of view 60 of camera 46 and based on the precision limitations of the inventive system. A more detailed discussion of the zoom level adjustment with respect to the movement of the subject is included below.

Orientation controller 70 is preferably equipped with light source 38, as shown. Light source 38 provides feedback to subject 12. According to one preferred embodiment, light source 38 is a light emitting diode (LED). Light source 38 preferably emits a light beam that is preferably collimated (collimated light beam 64) and is directed in a direction which sufficiently corresponds to the axis of the camera lens direction. The collimation of light source 38 may be fixed or zoom dependent.

The collimation of light source 38 is preferably fixed for a typical zoom camera angle (about five degrees with a variance of about two degrees in typical surfing applications, for example). The collimation angle may be adjusted by moving light source 38 closer or farther relative to a collimating edge, or collimating edges.

In one preferred embodiment, the collimation is substantially in one dimension only, meaning that the light beam is only substantially collimated in the direction corresponding to the panning movement of orientation controller 70. As will be discussed further herein, during filming, when subject 12 sees the light from light source 38, he or she knows that the camera is sufficiently pointing at him or her. In another embodiment, the collimation may be in two dimensions corresponding to the panning movement of orientation controller 70 and further corresponding to the camera tilt angle that may be manually or automatically adjustable. The two dimensional collimator may be an opening shaped as a square, a circle, etc.

Orientation controller 70 of automatic recording system 10 preferably comprises receiving/transmitting antenna 71, as shown. Receiving/transmitting antenna 71 is preferably mounted to orientation controller 70 in such a way as to maintain an optimum radiation pattern relative to remote device 16 which is free to move. The optimum radiation pattern is achieved when receiving/transmitting antenna 71 is oriented so that the direction in which receiving/transmitting antenna 71 is most effective is in the direction of the camera lens axis. Put another way, the optimum position of receiving/transmitting antenna 71 is, for most antennas, perpendicular to the direction in which it transmits. In certain embodiments the optimum antenna 71 position is maintained automatically.

Achieving HQVR requires precise control of camera 46 as it tracks subject 12. The precision of the orientation of camera 46 depends on several factors. These factors include at least the following: (1) the precision with which the locations involved in aiming camera 46 are determined; (2) the precision of determining the initial camera orientation; (3) the precision of the movement of the motor or motors that points camera 46; (4) the lag time and the rate of updating of the location of the target; (5) the angular velocity of the of the camera movements; and (6) the quality and reliability of the communication link between various parts of the system such as between, for example, orientation controller 70 and remote device 16.

The necessary precision of the orientation of camera 46 depends on the angle of its field of view 60; this angle is adjusted when the zoom is set. Put another way, for best results, the camera's field of view is preferably set or controlled, automatically or otherwise, based, in part, on consideration of the known orientation precision of the automatic recording system.

In some embodiments of the present invention, differential GPS, real time kinematic phase correction, and other correction methods are used to improve precision of location determination when using GPS for determining camera orientation.

In one embodiment of the present invention, camera 46 is mounted on orientation controller 70 that only provides automatic panning of camera 46. In this embodiment, the tilt and zoom of camera 46 are manually controlled and set by the user prior to recording. This embodiment can be adequate for recording, for example, surfing in the ocean. The focus of camera 46 may be camera controlled (i.e., using an autofocus feature of a commercial camera) or manually adjusted and set to a particular focal distance (such as the maximum setting to prevent camera 46 from focusing on an object in the foreground that is not the intended subject 12 of the recording). In a preferred embodiment, the focus is automatically controlled by the system based on the locations of the camera 46 and remote device 16. Further, additional manual adjustments may be made prior to recording. For example, the height of camera 46 may be adjusted with mast 36 and the tilt of the camera may be adjusted to a constant tilt position using a camera attachment device between orientation controller 70 and camera 46.

In the embodiment illustrated in FIG. 1, camera 46 is mounted on orientation controller 70 using a camera attachment device that comprises standard female-male attachment fasteners that are typically used for attachment to tripods. Some cameras, such as smart phones, may not be equipped with standard tripod attachment devices. To connect these types of cameras, a custom camera attachment device or adapter is preferably provided. The camera attachment device is preferably designed to be permanently or temporarily affixed to orientation controller 70 and preferably contains lock and quick-release mechanisms.

Tripods are commonly equipped with bubble levels. For best results tripod 34 preferably comprises one or more levels to level orientation controller 70. Orientation controller 70 or camera 46 may also preferably comprise a bubble or electronic level to assist in leveling automatic recording system 10 or in generating level footage as a result of using the automatic recording system. The system may also be manually sufficiently leveled by noting the view field of the camera 60 and adjusting components of the system, such as tripod 34, accordingly.

Figure 2:
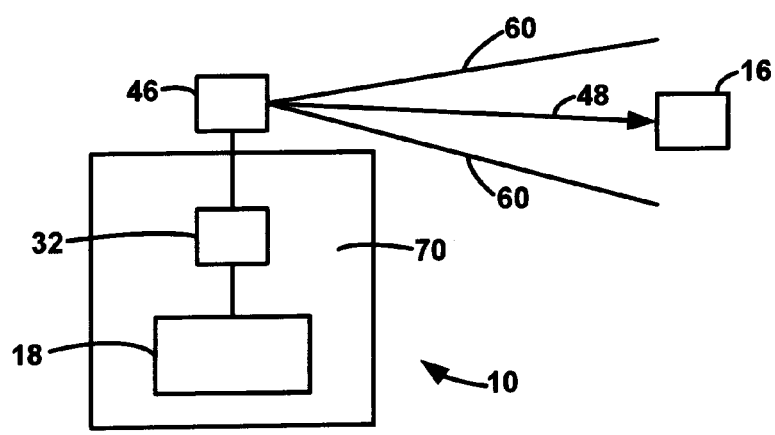
FIG. 2 shows a simplified block diagram illustrating the components of an automatic recording system according to a preferred embodiment of the present invention.

FIG. 2 shows a simplified block diagram illustrating the components of an automatic recording system according to a preferred embodiment of the present invention. Orientation controller 70 comprises two major components, namely positioner 32 and base station 18. Base station 18 comprises electronic components to communicate with remote device 16 and to process the data received from remote device 16 to control positioner 32. Positioner 32 orients camera 46 so that remote device 16 is sufficiently within field of view 60 of camera 46.

Figure 3:
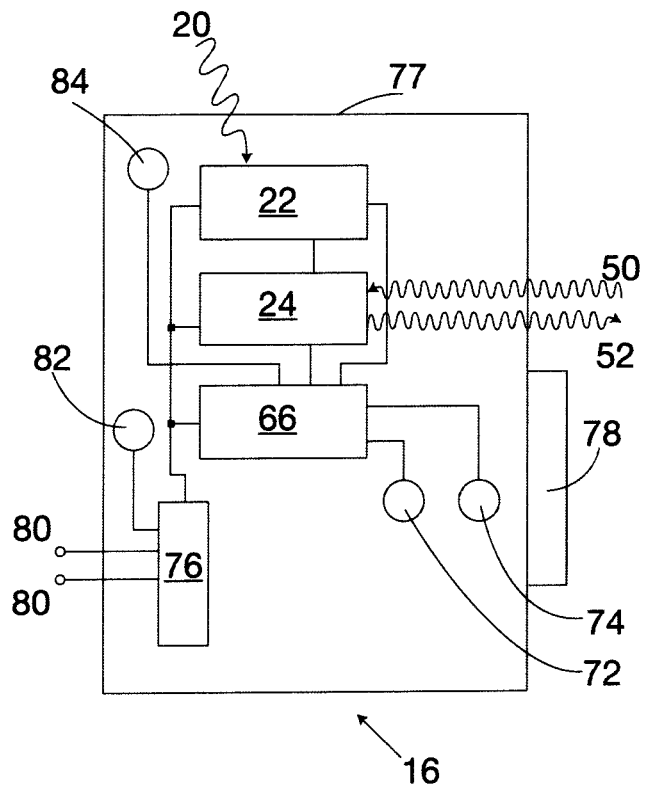
FIG. 3 shows a schematic diagram illustrating the electronic components of the remote device of an automatic recording system according to a preferred embodiment of the present invention.

FIG. 3 shows a schematic diagram illustrating the electronic components of the remote device of an automatic recording system according to a preferred embodiment of the present invention. Remote device 16 preferably comprises GPS unit 22 which receives signals (illustrated as signal 20) from a positioning system. The signals are provided by GPS and/or other similar satellite systems (or partially or fully terrestrial systems). The purpose of the signals is to determine a location of the signal receiver in terms of earth-centered, earth-fixed (ECEF) coordinates. It is noted that receivers and decoders that work with signals from alternative or additional positioning systems may be used as well.

The ECEF coordinates are preferably transmitted to microcontroller (MCU) 66. Microcontroller 66 is preferably programmed to receive ECEF coordinate data, to parse the data, and to send the data to transceiver 24. As shown in FIG. 3, microcontroller 66 also receives data from on/off button 72, setup button 74, and transceiver 24. Transceiver 24 receives and sends radio signals 50 and 52, respectively, to a transceiver associated with orientation controller 70. Transceiver 24 also sends data to and receives data from microcontroller 66. Microcontroller 66 also sends data to the status indicator LED 84, as shown.

The electronic components of remote device 16 are preferably powered by a rechargeable battery 76. A battery charge indicator 82 is provided, as shown. Generally speaking, the power requirements of GPS units are strict. Those having skill in the art will understand that remote device 16 may comprise other electronic elements, such as filters, to meet the appropriate power requirements.

The electronic components of remote device 16 are preferably housed in enclosure 77. Enclosure 77 of remote device 16 may be made using injection molding techniques or other similar molding techniques and may be made of a polymer, such as polyurethane.

Enclosure 77 is preferably equipped with fastener 78 to attach remote device 16 to the body or clothing of subject 12. Remote device 16 may be attached to the leg, arm, wrist, etc., of subject 12. Additionally, remote device 16 may be attached to sporting equipment used by subject 12. Further, remote device 16 may be connected with any object that is, or is part of, the subject of the recording.

Enclosure 77 is also preferably provided with two openings for charging contacts 80. Enclosure 77 is preferably sufficiently waterproof and is capable of surviving certain impacts. The LED indicators, or light therefrom, associated with remote device 16 are visible through transparent or translucent areas of enclosure 77. Preferably, the materials and the construction of remote device 16 ensure that the device will float in water.

In one preferred embodiment of the present invention, remote device 16 is preferably equipped with additional input and/or output means. The additional input and/or output means may include buttons, switches, speakers or other means of vibration creation, touchscreens, or the like. These additional input means give subject 12 the ability to communicate with, receive information from and give commands to base station 18 using remote device 16. These commands are essentially manual overrides and may include, for example, (1) initialize, (2) pan right, (3) pan left, (4) begin recording, (5) stop recording, and (6) zoom in/out. One reason for initiating one or more of the listed commands is that the subject receives feedback from orientation controller 70 regarding the state of the system such as the state of recording. It is noted that some of the listed commands require ability to control the camera. In those embodiments where the automated recording system does not include camera control, remote device 16 may be equipped with a "marker" button, or control. Operating the marker control preferably sends a signal to base station 18 causing positioner 32 to quickly move the camera away from its present position and then back to its prior position. The camera should be moved to a sufficient degree and/or with sufficient speed so that the camera field of view change is noticeably distinct from the prior field of view. This feature provides at least one major advantage in that these camera movements may be used efficiently to find interesting or important recorded video footage. For example, when engaged in surfing, the subject may catch a wave and, when he has completed his run, he may initiate the above-described marker function. As noted, the remote device could include camera control buttons, switches, etc. In one preferred embodiment, remote device 16 is preferably equipped with a "record last" button or control. Such a control would send a command to camera 46 to store the last N minutes of footage as a separate file. N, the number of minutes to be stored, may be selected during setup from an array of choices (e.g., 1, 2, 3, or 4 minutes or other selectable values) or by inputting a specific number of minutes. In yet another embodiment, remote device 16 may contain a display for real time or delayed playback of recorded video using communication technology known to those having skill in the art which would allow footage recorded by the camera to be displayed on the remote device. In still another embodiment of the present invention, voice recognition means are provided for speaking commands to control base station 18 via remote device 16. One advantage of the ability to start and stop recording by speaking commands is that a surfer, for example, could say "RECORD" when he begins to paddle toward a wave and say "STOP" when he has completed surfing a wave. This would eliminate the need to watch long stretches of video (which may span hours) to select only those sections that will be of interest to the surfer. The automated recording system can be used to record during several hours of activity, such as a surf session, to ensure the highest likelihood of capturing unexpected events. One or more of the above embodiments for marking important events may be implemented to ease the editing burden after use of the automated recording system.

Figure 4:
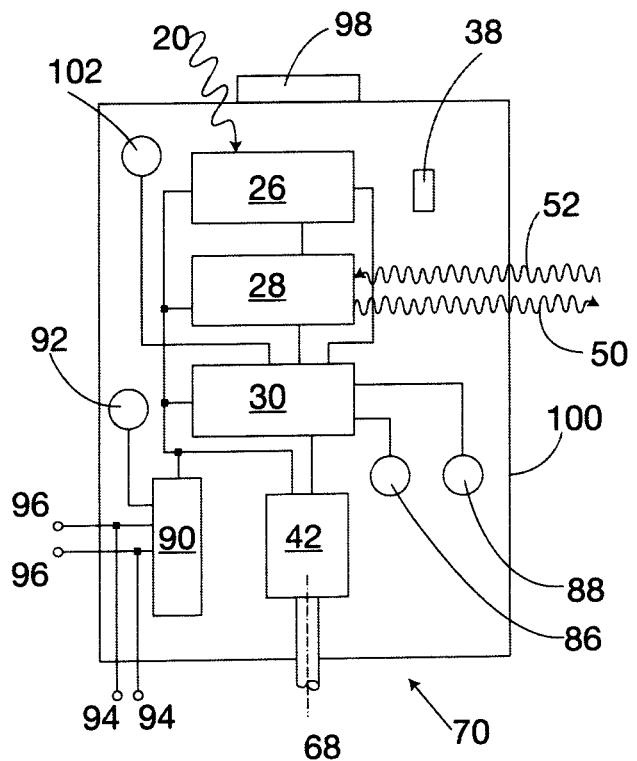
FIG. 4 shows a schematic diagram illustrating the electronic components of the orientation controller of an automatic recording system according to a preferred embodiment of the present invention.

FIG. 4 shows a schematic diagram illustrating the electronic components of the orientation controller of an automatic recording system according to a preferred embodiment of the present invention. Orientation controller 70 preferably comprises base station 18 and positioner 32 (see FIG. 2). Although not necessary for certain embodiments of the present invention, orientation controller 70 may include GPS unit 26 that receives signals (depicted as signal 20) from GPS satellites or similar positioning system. The ECEF coordinates are transmitted within base station 18 to a central processing unit (CPU) 30 that is programmed to receive the coordinate data together with data from on/off button 86, setup button 88, and transceiver 28. Transceiver 28 sends and receives radio signals 50 and 52, respectively, to and from remote device 16. Transceiver 28 also sends data to and receives data from CPU 30. CPU 30 also sends data to pan drive 42. Pan drive 42 may include means, such as encoded wheels and related sensing devices (not shown), to control motion of output shaft 68. It is noted that other embodiments of the invention may incorporate a tilt drive and the statements made herein concerning the pan drive are applicable to the tilt drive as well.

The electronic parts of base station 18 are powered by battery 90 which is preferably rechargeable. A charge indicator LED 92 is provided to indicate whether battery 90 needs charging. As noted above with respect to remote device 16, the power requirements of GPS unit 26 are strict and electronic elements including filters may be provided to meet the necessary power requirements. Both the elements of base station 18 and positioner 32 are preferably housed in a common enclosure (enclosure 100). Positioner 32 preferably comprises pan drive 42 and turning shaft 68. Enclosure 100 is preferably equipped with fastener 98 (shown schematically in FIG. 4). In the embodiment shown in FIG. 4, fastener 98 couples orientation controller 70 to a mounting base (embodied in FIG. 1 as tripod 34) such that output shaft 68 turns relative to orientation controller 70. In still another embodiment, fastener 98 is coupled to output shaft 68 and mounting base 34 such that orientation controller 70, which is coupled to pan drive 42, moves relative to the mounting base 34 which is fixed relative to earth during use.

Enclosure 100 preferably has two openings for charging pins 94 to which an appropriate charger may be attached. Appropriate circuitry within base station 18 preferably provides electricity for charging contacts 96. In the embodiment shown in FIGS. 3 and 4, remote device 16 may be charged through orientation controller 70 by engaging charging pins 80 of remote device (see FIG. 3) with charging contacts 96.

Pan drive 42 is preferably coupled to driving shaft 68 through a gearbox that preferably includes elements to compensate for rotational play. In a preferred embodiment, camera 46 is firmly attached to orientation controller 70 using a camera attachment device (not shown) or by integration of a camera into orientation controller 70. Pan drive 42 moves the orientation controller 70 together with camera 46 based on commands it receives from CPU 30 as discussed further below.

As discussed above, orientation controller 70 is preferably outfitted with light source 38. Light source 38 is preferably recessed on enclosure 100. Light source 38 preferably shines a collimated light beam along pointing vector 48 (see FIG. 1). Light source 38 is preferably an LED powered by battery 90. With reference to FIG. 1, subject 12 can only see the light beam emanating from light source 38 when he or she is in field of view 60 of camera 46. Light source 38 is preferably recessed, so that an opening on the front of enclosure 100 functions as a collimator. Light source 38 provides visual confirmation to subject 12 that orientation controller 70 or positioner 32 is properly pointing camera 46 substantially in his direction.

Base station 18 comprises status indicator LED 102, as shown. When setting up or initializing automatic recording system 10, the status of base station 18 may be determined by observing changes in status indicator LED 102 (e.g., changing of color, blinking, etc.). In other embodiments, orientation controller 70 may also be equipped with other light sources used during setup/initialization of the system.

In one preferred embodiment of the present invention, the location of orientation controller 70 is stationary during recording and location updates from GPS unit 26 are used to implement a differential GPS method, a real time kinematic phase corrective method, and/or other location correction methods such as coordination with GPS unit 22 of remote device 16 as to which satellite or other signals to use for location calculations to improve the precision of the relative location determination of remote device 16. In another embodiment of the present invention, base station 18 is not equipped with a GPS unit. In such an embodiment, GPS unit 26 is not present. Thus, base station 18 performs no location update regarding its own location during recording. In another embodiment of the present invention, base station 18 may be a separate unit from positioner 32 such that base station 18 and positioner 32 are not housed in a single enclosure. Having base station 18 and positioner 32 in the same enclosure is convenient and efficient for some embodiments. It is noted however, that the present invention includes embodiments where a single base station controls multiple positioners and cameras. Further, the base station may be a separate unit located some distance from the positioner it controls. In these embodiments, additional signal transmission systems are provided to establish communication between the base station and the one or more positioners and cameras.

Figure 5:
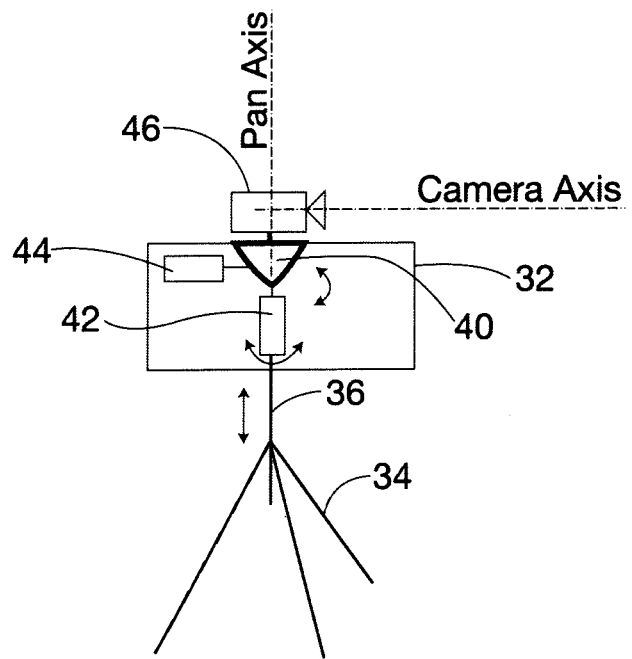
FIG. 5 is a schematic diagram illustrating various adjustment features of an automatic recording system according to a preferred embodiment of the present invention.

FIG. 5 is a schematic diagram illustrating various adjustment features of an automatic recording system according to a preferred embodiment of the present invention. FIG. 5 depicts one preferred embodiment of the present invention illustrating positioner 32 mounted on a mounting base. The mounting base shown in FIG. 5 is tripod 34. It is noted that other mounting bases may be used. An elevating mast 36 is preferably included to raise and lower positioner 32, as shown. Mast 36 allows for manual adjustment of the camera orientation as an override of the orientation controller 70 that may be used, for example, to have the subject intentionally off center in the frame of the camera. Mast 36 may be integral to tripod 34 or it may be a separate attachable component. Preferably, positioner 32 includes an integrated gimbaled platform 40. Gimbaled platform 40 is preferably mounted atop elevating mast 36, as shown. In those embodiments in which the mounting base does not include an elevating mast 36, positioner 32 may be mounted directly to the mounting base. Camera 46 is preferably mounted to gimbaled platform 40. Positioner 32 also preferably comprises pan drive 42 to pan camera 46 and tilt drive 44 to tilt camera 46. The tilt axis is perpendicular to the plane of the schematic of FIG. 5, and if the camera 46 is tilted, the camera axis will be no longer horizontal as shown.

Figure 6:
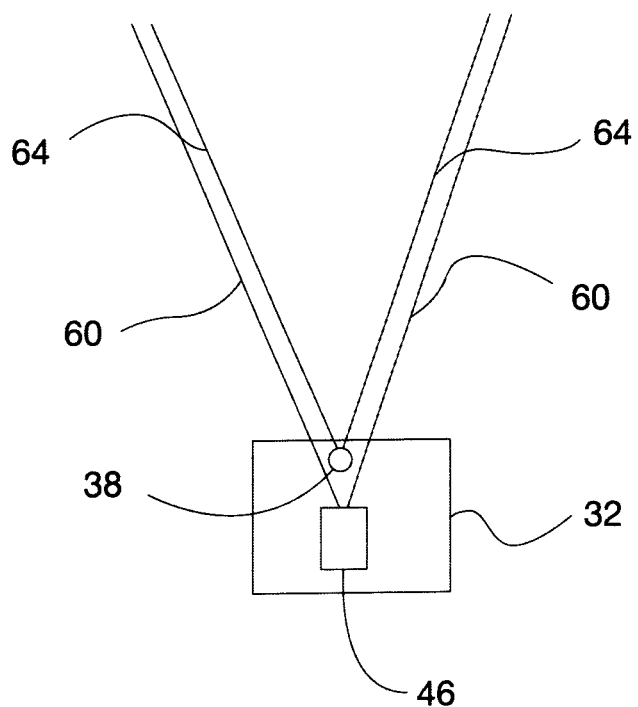
FIG. 6 shows an overhead schematic diagram illustrating an embodiment of the feedback light source of an automatic recording system according to a preferred embodiment of the present invention.
Figure 7:
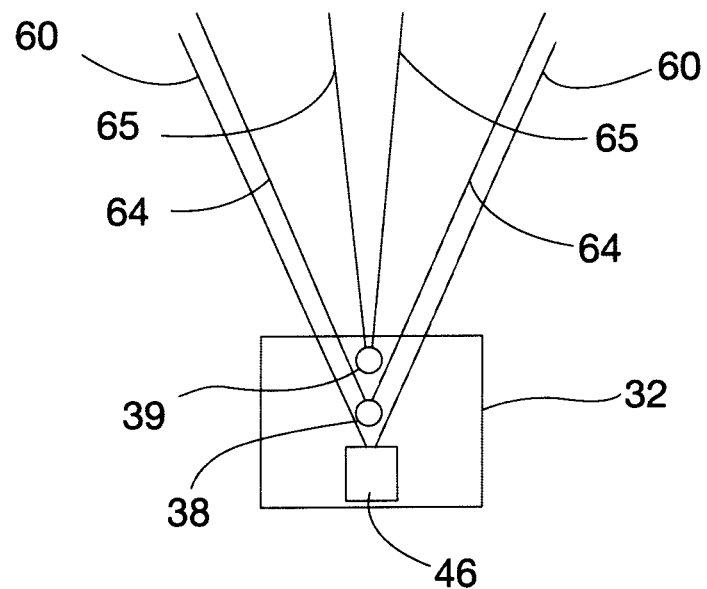
FIG. 7 shows an overhead schematic diagram illustrating another embodiment of the feedback light of an automatic recording system according to a preferred embodiment of the present invention.
Figure 8:
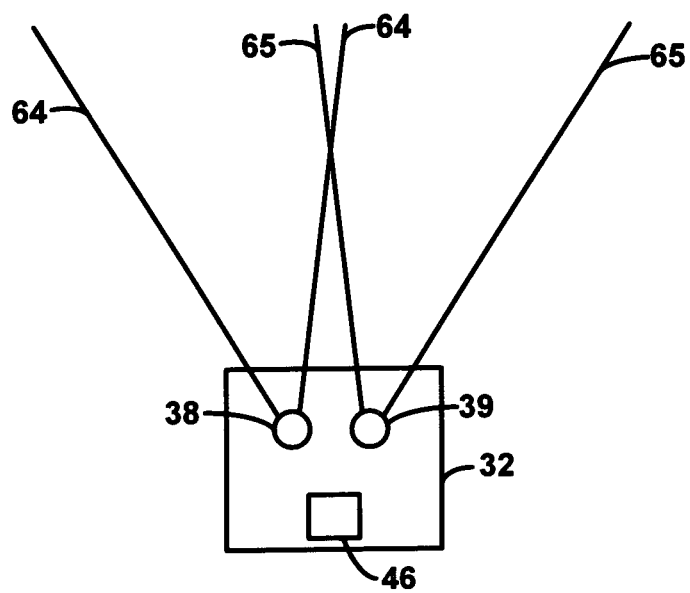
FIG. 8 shows an overhead schematic diagram illustrating yet another embodiment of the feedback light of an automatic recording system according to a preferred embodiment of the present invention.

FIG. 6 shows an overhead schematic diagram illustrating an embodiment of the feedback light source of an automatic recording system according to a preferred embodiment of the present invention. FIG. 7 shows an overhead schematic diagram illustrating another embodiment of the feedback light of an automatic recording system according to a preferred embodiment of the present invention. FIG. 8 shows an overhead schematic diagram illustrating yet another embodiment of the feedback light of an automatic recording system according to a preferred embodiment of the present invention. The embodiments of FIGS. 6, 7, and 8 show different ways in which the subject of the recording may be informed that camera 46 continues to substantially point at him or her. Because the subject of the recording will be some distance away from camera 46, a feedback system to let the subject know that the system is working properly is advantageous. FIGS. 6, 7, and 8 are top down views of the positioner 32 with camera 46 and feedback light sources 38 and 39. All parts shown in these drawings are not necessarily in the same horizontal plane.

In the embodiment shown in FIG. 6, the feedback is provided by collimated light beam 64. As discussed above, collimated light beam 64 is emitted by light source 38 which may be an LED, or other light source. Field of view 60 of camera 46 and collimated light beam 64 are characterized by having substantially the same angle and pointing in the same direction. If the automatic recording system is equipped with automatic zoom control of camera 46, a corresponding control is provided to adjust the collimation angle of light source 38. This control may be a motor that moves light source 38 farther from the collimating slit or edge for narrower zoom angles (when the camera zooms in).

Turning now to FIG. 7, in the embodiment shown, two lights sources are used, namely light source 38 and light source 39, as shown. The light sources are preferably LEDs emitting different light colors. Light source 38 emits a first color and light source 39 emits a second color that is distinct from the first color of light source 38. In this embodiment, collimated light beam 64 of light source 38 is wider than that of light source 39. Collimated light beam 64 preferably corresponds to the zoom angle of the camera. Collimated light beam 65 is preferably substantially narrower than collimated light beam 64, as shown. Both collimated light beams preferably point in the direction the camera is pointing, as shown. In this embodiment, subject 12 will know that he or she is in the field of view of camera 46 when he or she sees the light color of light source 38. If subject 12 is centered, i.e., the subject is close to the middle of the field of view of camera 46, he or she will see light of mixed color. If the subject sees no light, then he or she knows that he or she is not in the field of view of camera 46.

Turning now to the embodiment illustrated in FIG. 8, the light beams of light source 38 and light source 39 are positioned so that they point to the left and right, respectively, of camera 46. In this arrangement, there is a narrow area which corresponds to the camera axis where the beams of light from both light sources are visible. When the light sources are different colors the aforementioned narrow area appears as a mixed color. When the subject 12 is off center, the subject knows in which direction camera 46 is off, namely off to the left or off to the right. Based on this feedback, subject 12 may elect to re-initialize the automatic recording system 10 so that he or she is in the center of the field of view of camera 46.

In order for automatic recording system 10 to operate properly in realistic circumstances, the systems and methods hereof must take into consideration various factors including the uncertainties of the location of camera 46 and of remote device 16. The distance between remote device 16 and camera 46 that is required for setup and operation is determined by the knowable or known uncertainties of the locations of the camera and remote device. Larger distances and wider field of view 60 are required for embodiments relying on less precise locations.

Taking into account a typical example of recording surfing, the camera's field of view may be set to a zoom angle of about five degrees with the camera about 200 to 800 feet from the surfer. In this case, at least a precision on the order of about ±2.5 degrees is desirable. With the assumption that the uncertainty of the location of remote device 16 with respect to camera 46 is about ±8 feet, then the necessary minimum operating distance to achieve precision on the order of about ±2.5 degrees is about 183 feet (calculated as 8 feet/tan(2.5 degrees). If the location of remote device 16 is 99 percent of the time within the about ±8 feet boundary, subject 12 will be inside the field of view of the camera 60 99 percent of the time. Applicant has observed that inherent error related to GPS positioning gives some uncertainty regarding the orientation of the camera. In circumstances where the camera is near the remote device (e.g., less than about 183 feet in the above example), the inherent error in GPS position will decrease the precision desired to keep the subject in the field of view of the camera and will lower the probability of capturing high quality videos.

Figure 9:
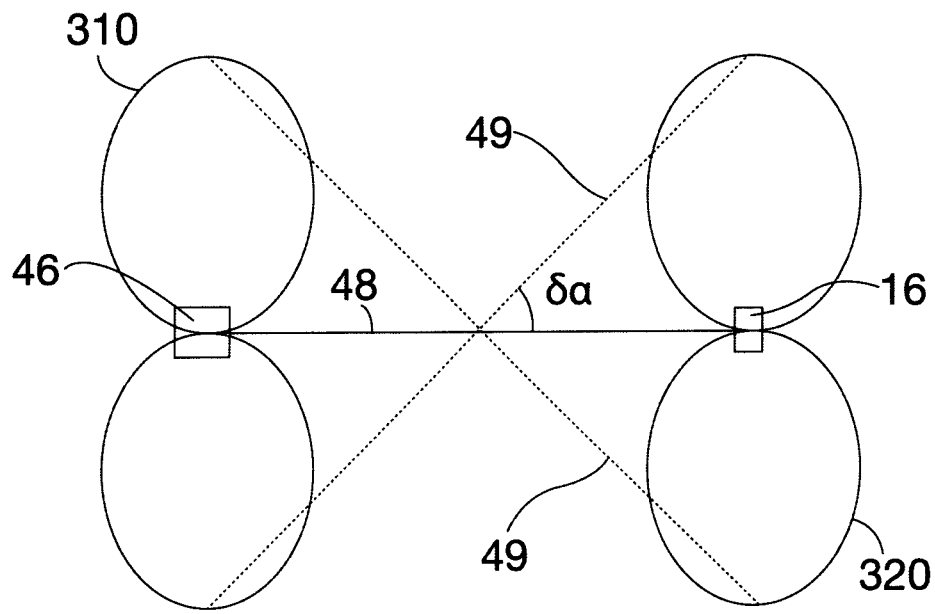
FIG. 9 shows a schematic diagram illustrating error issues encountered in determining the position of the components of an automatic recording system.

FIG. 9 shows a schematic diagram illustrating error issues encountered in determining the position of the components of an automatic recording system. More particularly, FIG. 9 illustrates the concept of angular uncertainty (denoted as 6a) caused by inherent GPS uncertainty. The systems and methods of the present invention may rely on GPS data to determine angular movements that will cause a camera to keep pointing in the direction of a moving subject. GPS uncertainties are different in orthogonal directions. Thus, the area of uncertainty around a location obtained from GPS may be represented by "error bubble" 310 and 320. In a worst case scenario, the maximum uncertainty extends the distance measured by the longer diameter of the error bubbles on opposing sides of the actual location of remote device 16 and camera 46, as shown. This distance is referenced as extreme direction 49. The uncertainty using an exemplary inexpensive GPS unit is about eight feet or about 2.5 meters but can be less than that. With this level of uncertainty, it is possible that pointing vector 48 may be pointing in any direction between the extreme directions 49. The $\delta\alpha$ uncertainty is determined by the GPS uncertainty of $E_0$=8 feet and by the distance between camera 46 and remote device 16. For example, if the desired angular precision is $\delta\alpha$=2.5 degrees, then the necessary distance ($D_0$) between base station 18 and remote device 16 may be calculated as follows:

$$D_0 = 2E_0/\tan(\delta\alpha)$$

Substituting the value of 8 feet for $E_0$ and the value of 2.5 degrees for $\delta\alpha$ results in a $D_0$ value of 366.5 feet. It is noted that if a GPS unit with lesser uncertainty is employed, the distance $D_0$ may be reduced. Another way to decrease $D_0$ is to use less "tight" shots (i.e., shots that are "zoomed" out) with high resolution and edit the video in post-production.

Another issue with GPS units is their step size. Although the uncertainty in location is about eight feet, consecutive readings are typically only one eight inch step apart. So, while the subject may not be at the center of the frame all the time, movements as small as six inches may be detected. Hence the angular precision of the camera movements must be much better than the $\delta\alpha$=2.5 degree value noted in the example above. If the camera-to-subject distance is 500 feet, the eight inch GPS step corresponds to an angle of about 0.076 degrees. If the movements of a camera are in steps similar to this value or larger than this value, the viewer of the recording may notice a jerkiness as the camera follows the movements of a subject. In Applicant's experience, in order to obtain smooth, high quality videos it is best to have the ability to turn the camera in angular steps less than about 0.1 degrees and embodiments of the present system and method accomplish step sizes of about 0.05 degrees. This is accomplished using inexpensive motors equipped with gearboxes and employing optical encoded wheel technology as discussed further herein.

Figure 10:
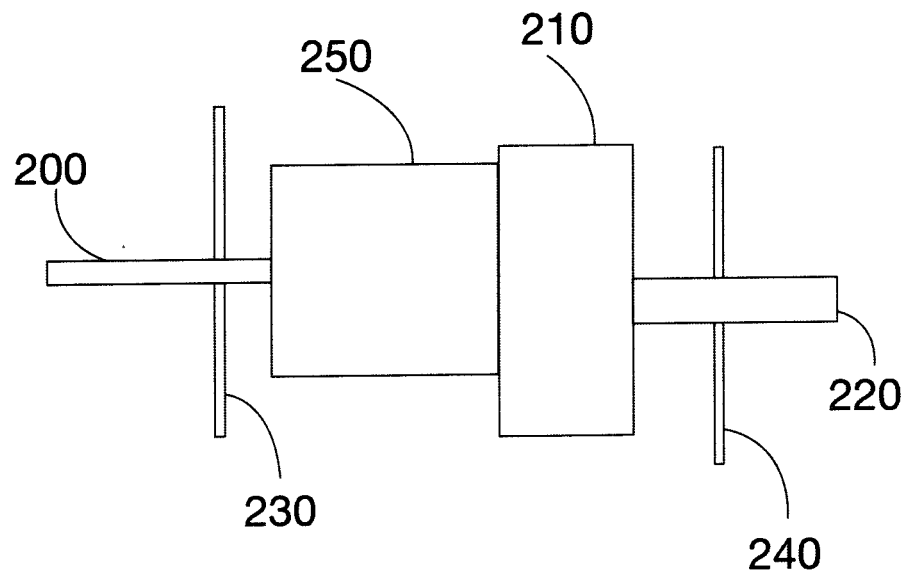
FIG. 10 shows a schematic diagram illustrating a motor assembly of an automatic recording system according to a preferred embodiment of the present invention.

FIG. 10 shows a schematic diagram illustrating a motor assembly of an automatic recording system according to a preferred embodiment of the present invention. Positioner 32 (see FIG. 2) preferably comprises at least one motor assembly as described herein. The rotor shaft of motor 250 is shaft 200 which, as a driving (input) shaft, is connected to gearbox 210. Gearbox 210 significantly reduces the angular velocity of the driven (output) shaft 220 that turns an attached pointer (e.g., a camera). Driving shaft 200 and potentially driven shaft 220 are equipped with encoded wheels 230 and 240, respectively. When referring to encoded wheels, reference is also made to encoded wheel systems. Optical encoded wheel systems include light sources, detectors, and processing means that are commonly used with optical encoded wheels for detecting their movements, counting marker strips, etc. Encoded wheel systems are not limited to optical means of detecting shaft movement, and can be capacitive as well as magnetic. One preferred exemplary embodiment of the gear reduction value is 540× with encoded wheel 230 on driving shaft 200 having 100 markers. The gear reduction value is the ratio between rotations per minute on driving and driven shafts. Thus, the angular movement of driven shaft 220 when motor (driving) shaft 200 moves from one code strip of encoded wheel 230 to the next is about 1/54000 part of a turn, i.e., 0.0067 degrees.

Using a motor assembly such as the one depicted in FIG. 10 may have a backlash introduced by gearbox 210 and by any coupling elements between shafts 200 and 220 and gearbox 210. To make camera movements sufficiently precise, it may be necessary to eliminate rotational play, or backlash, or compensate for it. One solution for eliminating rotational play is to use a substantially direct drive connection between the motor and pointer. However, for HQVR, it is necessary to be able to move the camera both fast and slow. For example, the angular velocity for tracking a surfer who moves at about one foot per second at a distance of 600 feet from the camera is about 0.1 degrees per second. When using inexpensive motors, a gearbox or other similar device is preferably connected between the driving (input) and driven (output) shafts to sufficiently reduce the angular velocity of the driven shaft. The gearbox tolerances, however, introduce rotational play. Moreover, the rotational play may increase over time due to wear and tear of the gears. One solution to reduce rotational play of gearboxes is to always rotate the driven shaft in the same direction when approaching a desired angular position. However, when filming a freely moving object, the camera should move smoothly in more than one direction (if panning, to the left and right); thus, the aforementioned "same direction" method is not applicable. Another possible solution for reducing rotational play is to use a static load, for example, a tensioning spring. However, use of a static load increases the required motor torque.

One embodiment of the present invention preferably uses one or two encoded wheels to generate information concerning the angular position of a shaft and to control rotary motion. Further, the automatic recording system of the present invention is configured to compensate for some or all backlash as will be discussed further below.

The automatic recording system embodiment of the present invention compensates for backlash every time the base station 18 sends a command to positioner 32 that includes a change of direction of turning the camera. The advantage of this approach is that the system is not "catching up" after backlash occurs, but rather acts in a preventative manner.

According to one preferred embodiment, the backlash for the particular gearbox and related system components used is determined during manufacturing. The process is illustrated by the flow chart shown in FIG. 16. Once determined, a set value of the backlash is included when programming the firmware that controls CPU 30 of base station 18 (refer to FIG. 16, see step 300).

Figure 16:
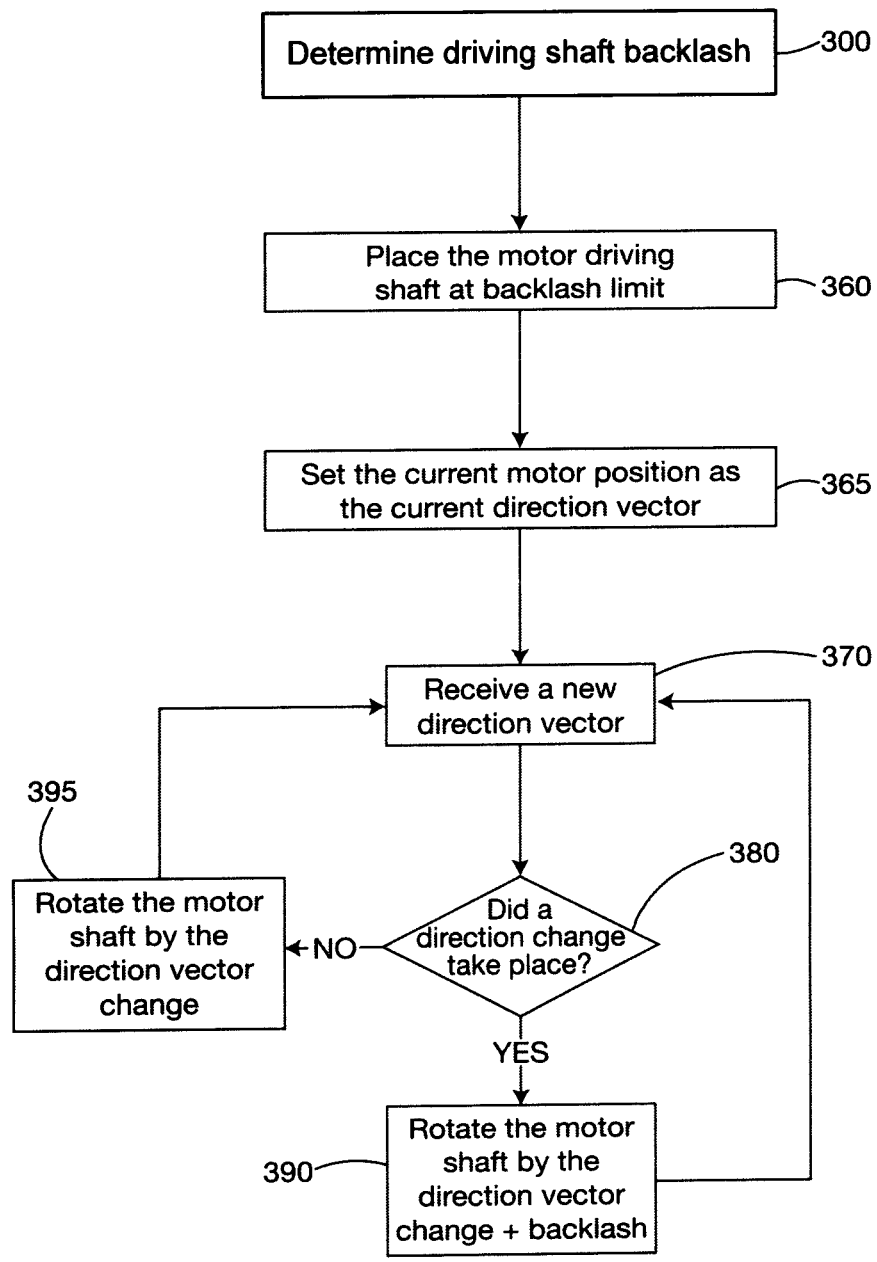
FIG. 16 shows a flowchart illustrating a method of backlash compensation according to a preferred embodiment of the present invention.
Figure 17:
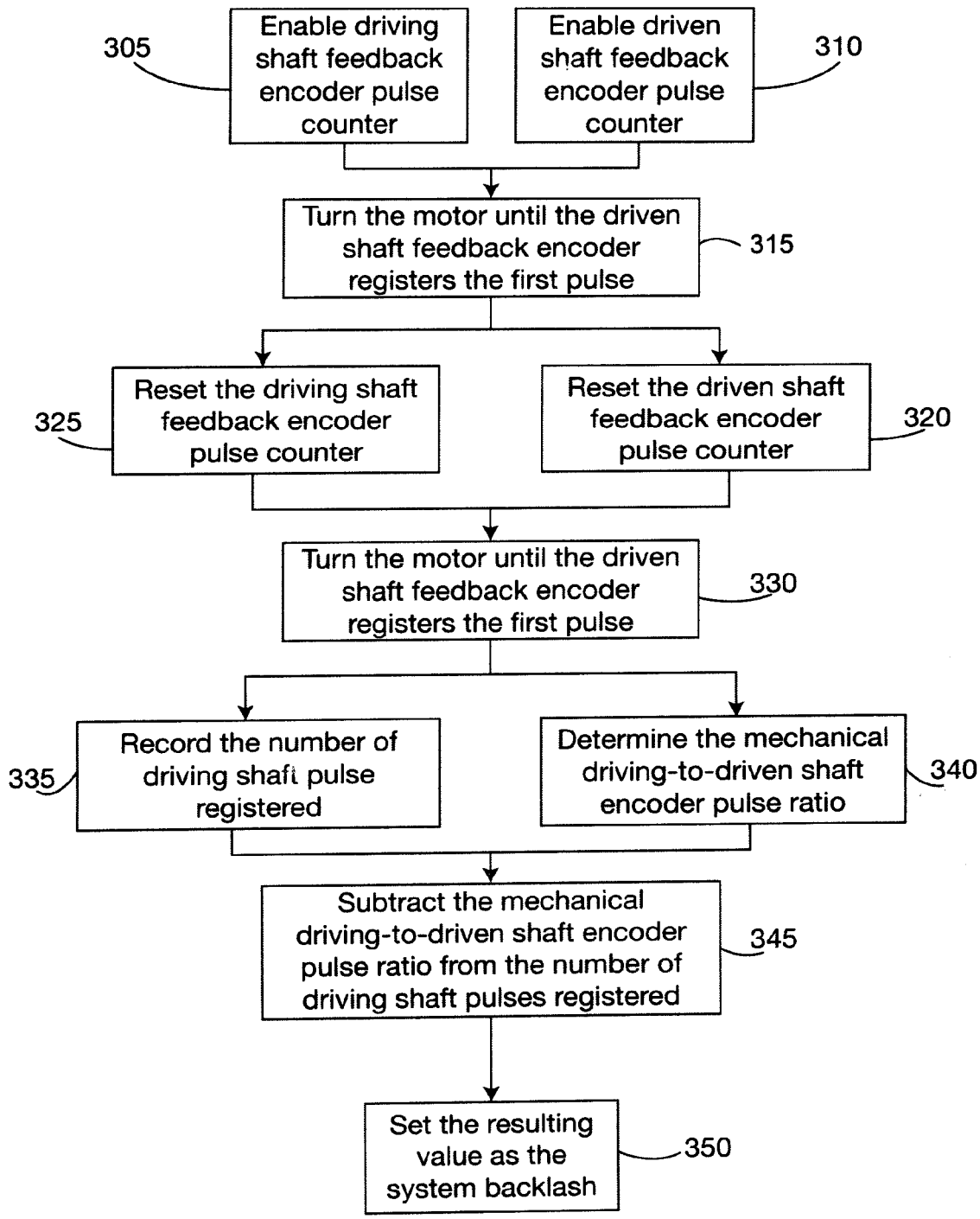
FIG. 17 shows a flowchart illustrating a method of measuring the backlash after power-up according to a preferred embodiment of the present invention.

According to another preferred embodiment of the present invention, a second encoded wheel (encoded wheel 240) is preferably attached to output shaft 220. This embodiment is illustrated by the flowchart shown in FIG. 17. With respect to the preferred embodiment including encoded wheel 240, the process illustrated in FIG. 17 provides the information to start the process of FIG. 16 at step 300. For those embodiments including the second encoded wheel, the steps of the process shown in FIG. 16 are carried out after the steps of FIG. 17 are completed. In the embodiment where the backlash is determined during manufacturing, the second encoded wheel 240 (FIG. 10) is not included. Second encoded wheel 240 is preferably used during a startup protocol for positioner 32 and both encoded wheel systems are enabled (step 305 and step 310, FIG. 17). Motor (input) shaft 200 is turned in one direction and the encoded wheel system registers the turning of the output shaft 220 in step 315. The motor is then stopped and both encoded wheels are reset in steps 320 and 325. Next, the turning direction of motor (input) shaft 200 is reversed and the encoded wheel system reads the position of motor (input) shaft 200 at the moment when turning of the encoded wheel 240 of the output shaft 220 is detected, step 330. To illustrate this, a numerical example follows. For example, encoded wheel 240 preferably has 100 markings around the wheel corresponding to an angular distance of about 3.6 degrees per marking. For the backlash measurement, motor 250 is turned in one direction an angle sufficient to start moving output shaft 220. The movement of the output shaft is monitored using the second encoded wheel 240. The turning of motor 250 is stopped when the output shaft is just past the edge of a coding strip (step 315). The positions of both encoded wheels 230 and 240 are set to zero (steps 320 and 325). Next, motor 250 is started again and instructed to move in the opposite direction. Because of the backlash experience, output shaft 220 and encoded wheel 240 do not start turning immediately. Motor 250 keeps turning and at the moment when encoded wheel 240 on driven (output) shaft 220 starts turning, the new position of encoded wheel 230 on input shaft 200 is registered (step 330). The turning angle of the input shaft is measured and recorded at step 335. The mechanical ratio between the pulse numbers registered on the driving (input) and driven (output) shafts is calculated at step 340. Alternatively, the mechanical ratio can be set as a constant in the firmware. The backlash is calculated to be the number of driving shaft pulses registered less the encoder pulse ratio (step 345) and set as the backlash value until the next power up of the system (step 350). The precision of this measurement depends on the width of the edge of the markings of second encoded wheel 240 and the definition of the light beam used for the detection of the movement of this encoded wheel. In Applicant's experience, the uncertainty of the backlash measurement is less than about 0.1 degrees. This backlash measurement procedure is preferably carried out every time the system is powered up and its value is saved for the recording session.

After the backlash is determined, the motor driving shaft 200 is turned to the backlash limit, i.e., to the position where turning further would begin turning the driven (output) shaft 220 (step 360). This motor position corresponds to the current direction received from the base station 18 (step 365). When a new direction vector is determined in step 370, the firmware of the base station decides whether a rotation direction change has occurred, step 380. If it has, the motor shaft is rotated in the reverse direction, adding the backlash, step 390. Otherwise the rotation occurs in the previous direction and backlash is not added, step 395.

Using a constant backlash value during the lifetime of the recording system has the advantage of making the system simpler and more affordable. At least one advantage of the other backlash compensation process described is that the system keeps up with any changes in the backlash that may occur over the lifetime of system due to normal wear and tear.

Figure 11:
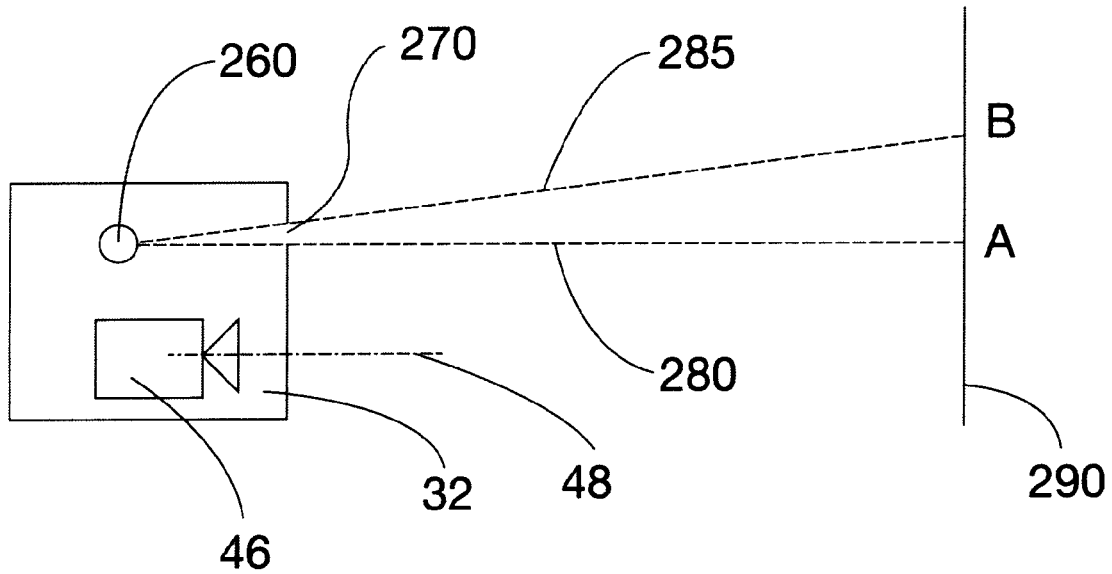
FIG. 11 shows an overhead schematic diagram illustrating a preferred embodiment of the setup light of an automatic recording system according to a preferred embodiment of the present invention.

FIG. 11 shows an overhead schematic diagram illustrating a preferred embodiment of the setup (initialization) light of an automatic recording system according to the present invention. More particularly, positioner 32 and camera 46 are shown equipped with collimated light source 260 that may be used during the initialization or setup of automatic recording system 10. (It is noted that orientation controller 70 of FIG. 1 could be shown in FIG. 11 instead of positioner 32 as the unit performing the functions described here). The relative orientations of the positioner 32 and camera 46 are preferably fixed for the initialization process. This collimation is accomplished by blocking a portion of the light from light source 260. As shown in FIG. 11, light source 260 is preferably collimated such that light beam 270 is delimited on one side. When this is done, direction 280 is parallel with pointing vector 48 of camera 46. The remote device is preferably placed at location 290. Location 290 will be typically about 100 to 500 feet away from camera 46. A user encountering the light at location A and location B will notice a difference in the characteristic of the light at each location. The light at location B at the other side 285 of the light beam is easily distinguishable from the light at location A because at location B the light is far from the area where camera 46 is pointing. The subject can find the center of the view field of the camera by finding location A.

As stated herein, the present invention includes both systems and methods for high quality video recording. HQVR may be achieved with a combination of three complex strategies, each involving a number of steps. A first strategy is the establishment of a reference camera orientation using an initialization or setup procedure. A second strategy is the establishment of unique communication between a remote device and a base station. A third strategy is the use of the flow of the angular information regarding the movements of the subject to actually move the camera to follow the subject. A preferred embodiment of the present invention employs all three of these strategies thereby achieving a high level of HQVR.

An essential requirement for recording using the systems and methods hereof is that the camera point substantially towards the subject. To achieve this, the relative positions of the camera and the subject must be known and the pointing direction of the camera must be known. The systems "know" this information by measuring and determining this information and storing what is determined in an appropriately programmed microcontroller or computer. The relative positions of camera 46 and subject 12 may be determined from signals received by GPS units in base station 18 and remote device 16 where camera 46 is at the location of base station 18 and remote device 16 is located with subject 12. The direction of camera 46 may be known in absolute terms (i.e., relative to directions like horizontal, north, etc.) using a set of devices such as a level, a compass, gyroscopes, and the like. The direction of camera 46 may also be known in relative terms (i.e., with reference to an initial direction). The setup procedure of the system is a method of finding and saving the initial direction of camera 46 without using devices that determine the absolute direction of camera 46.

Unique communication between a remote device and a base station is accomplished using transceivers 24 and 28 of remote device 16 and base station 18 (see FIG. 3 and FIG. 4). The transceivers must be able to communicate with each other while ignoring signals from other similar units which may be operating in the same vicinity. For example, multiple automatic recording systems 10 may be set up on the same beach in close proximity. Unique communication is also necessary when multiple base stations and/or multiple remote devices are employed as parts of a single system. The communication between base station 18 and remote device 16 preferably occurs using a radio link which operates at the ultra-high frequency (UHF) range (e.g., 2.4 GHz). At the nominal 2.4 GHz, a transmitter actually has a multiplicity of separate exact frequencies called channels at which it operates. Each channel is close to 2.4 GHz but slightly off from one other so that crosstalk is eliminated. Data is sent over the radio link every time GPS unit 22 refreshes coordinates (about every 10 to 500 microseconds). Each transmission lasts a very small length of time. Nevertheless, there is a small probability that messages from devices sent over the same channel may "collide" (i.e., arrive during time periods that overlap). These colliding messages cannot be interpreted. Thus, they are ignored by the system. If multiple devices broadcast on the same channel and keep sending messages at constant time intervals, it is possible that a whole series of communications may "collide". This is avoided by implementing a random delay in the time each message is sent. The delay time is preferably short compared to the GPS refresh time but long compared to the duration time of each message.

Transceiver 22 of remote device 16 preferably generates a random identification number (ID) that is placed within each data packet sent to base station 18. Base station 18 registers the ID during a pairing process and ignores any data packets that do not have the correct random ID. Likewise, messages from base station 18 to remote device 16 include the same ID and communication packets with a different ID are ignored. A new random ID is preferably generated each time the remote device is powered up. Therefore, pairing must take place so the base station "knows" what the new ID is each time the remote device is turned on. To establish first communication after power up, both base station 18 and remote device 16 use the same default radio channel (e.g., channel one). The user pushes simultaneously a button on the remote device and on the base station. While both buttons are depressed, the base station and remote device set the random ID for the session. Once this is accomplished, they switch to a different radio channel selected randomly by the base station. If two users are pairing separate systems simultaneously, the systems will recognize this scenario and wait until the users try to pair the device again. The channels that are used for normal operation mode are different from the channel used for pairing. Since pairing only takes a brief period of time, the channel used for it will generally be relatively quiet. It is a manufacturing decision whether the pairing is initiated by the remote device 16 (as described above) or by the base station 18.

Once setup and pairing has been established, the base station 18 and remote device 16 have a quasi-continuous flow of location coordinates of the remote device 16 and subject 12. This information is converted into a quasi-continuously updated series of angles of pointing vector 48. It is noted that simply giving commands to electrical motors to move camera 46 to keep up with the angles will not result in HQVR due to the issues addressed above (for example, backlash, GPS uncertainty, jumpiness, etc.).

Figure 12:
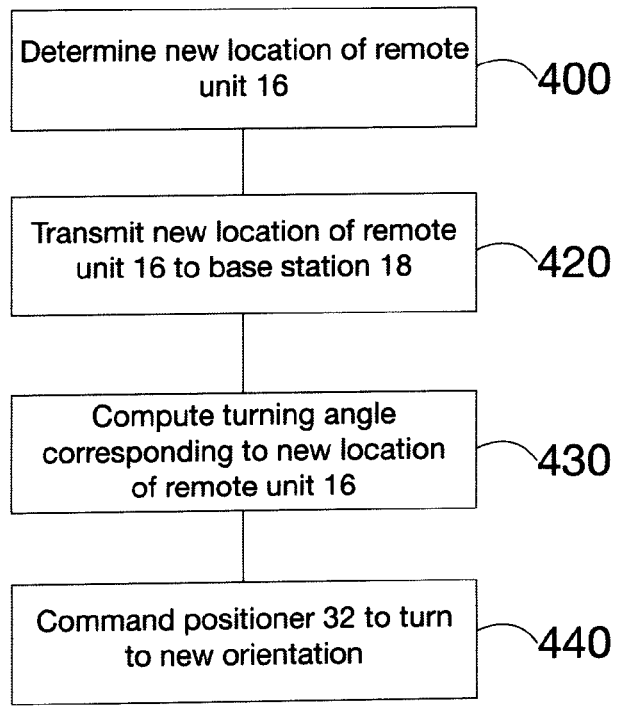
FIG. 12 shows a flowchart illustrating an automatic recording method according to a preferred embodiment of the present invention.

FIG. 12 shows a flowchart illustrating an automatic recording method according to a preferred embodiment of the present invention. The process illustrated in FIG. 12 occurs when CPU 30 of base station 18 has data concerning the location and orientation of camera 46. The method illustrated by FIG. 12 assumes that in the initial orientation of the camera pointing sufficiently in the direction of the subject has been previously saved and communication between base station 18 and remote device 16 has been previously established.

In step 410, a new or updated location of remote device 16 (which is collocated with the subject of the recording) is obtained. For the purposes of this disclosure, objects are collocated when the distance between the objects is much less than the usual location determination error observed when using the locating devices described herein (e.g., GPS devices). Furthermore, when two objects are described as associated with one another they are also considered to be collocated. As noted above, the remote device 16 may be worn by the subject, and, when so worn, the remote device 16 is collocated with the subject. Additionally, when two objects are described as being in close proximity with one another they are also considered to be collocated.

Next, in step 420, the new or updated location of remote device 16 is transmitted to base station 18. The new or updated coordinates of remote device 16 are used to compute an angle for orienting camera 46 to track subject 12 (step 430). In a preferred embodiment, decision points for various data stream occurrences, such as missing data points, steady or unchanged subject locations, small movement by the subject, fast movements by the subject, and the like. In step 440, the computed data is converted into a command, or drive signal, sent by CPU 30 to positioner 32 to move camera 46 to a new angle in accordance with the updated position of remote device 16. In those embodiments where the CPU also controls camera functions, the CPU sends appropriate commands, such as zoom in or zoom out, to the appropriate function of the camera. The process illustrated in FIG. 12 is repeated every time a location update is generated in remote device 16.

It is noted that the process illustrated in FIG. 12 assumes that the orientation of camera 46 is known at the start of the process. If the orientation is not automatically known such as by sensing, an initialization or setup process is necessary to start process of FIG. 12.

The updating frequency for the process of FIG. 12 depends on the GPS unit or units employed. The updating frequency is preferably in the 2 to 100 Hertz range. The substantially continuous updating of the location coordinate data allows substantially continuous tracking and continuous visual contact of subject 12 by camera 46. As subject 12 (collocated with remote device 16) moves, his, her, or its movement is characterized by an s(t) function, i.e., the location in time. The velocity v(t) is the first derivative and the acceleration a(t) is the second derivative of this function; both are computed by the CPU using routine techniques.

As discussed above, there may be a camera direction error caused by the time lag present from the time when the location measurement is taken until the time when camera 46 points to the location. This time lag depends on (1) the processing speed of the GPS unit(s), (2) the processing speeds of microcontroller 66, CPU 30 and transceivers 24 and 28, and (3) the mechanical speed of positioner 32. (Zooming and the speed of zoom adjustment may also play a role in the quality of aiming camera 46). The longer it takes for automatic recording system 10 to process and transmit data in response to the measured location of remote device 16 and the slower the mechanical components of positioner 32 react, the larger the camera direction error may be. In applications where this error is significant, the error may be reduced by estimating the anticipated position of the target based on past location, velocity, and acceleration information and instructing the positioner to move to the anticipated position. Therefore, the CPU 30 is preferably programmed to predict "current" positions of the target based on recent past s, v, and a values. The velocity with which the positioner moves is proportional to the size of the angle between current angle and the angle of the most recently determined target location. (Note that the current angle of the positioner may lag behind the angle that corresponds to the "current" position of the target). Using anticipated positions provides for faster camera movement when necessary but may sometimes result is overshooting errors.

In one preferred embodiment, CPU 30 preferably employs a process to estimate or predict the magnitude of the positioning error of the remote device 16. When the magnitude of the positioning error has been estimated, a signal is sent to camera 46 to adjust the camera zoom so that the field of view is sufficiently wide. For example, at high or fast changing velocities, the likely pointing error may increase. When this occurs CPU 30 preferably sends a signal to the camera to zoom out. The velocity of the subject 12 may also be viewed in comparison with the field of view 60 when the distance between the camera and the target are taken into account. For example, if the target is at a distance of 600 feet from the camera and the field of view is five degrees, then the distance between the edges of the viewed region is about 52 feet. If the subject is capable of accelerating to a velocity such that they cover a distance of about 26 feet within the known lag time of the system, such as one second, the subject may get to the edge of the field of view before the automatic recording system 10 reacts to the sudden motion. In this case, preferably, the camera 46 should zoom out and possibly zoom back in when it has caught up with the subject based on the subject's most recent location, velocity, and acceleration data.

Figure 13:
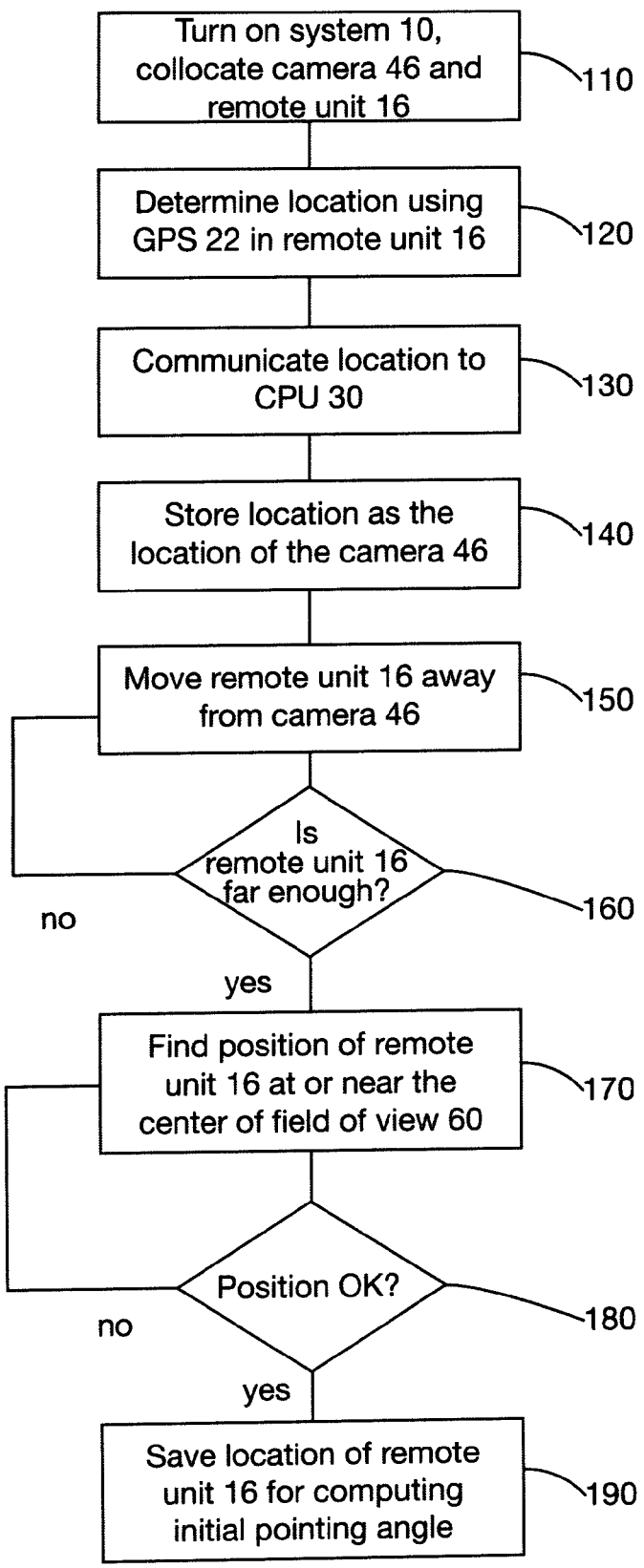
FIG. 13 shows a flowchart illustrating an automatic recording system initialization method according to a preferred embodiment of the present invention.

FIG. 13 shows a flowchart illustrating an automatic recording system initialization method according to a preferred embodiment of the present invention. The process of FIG. 13 begins with step 110. In step 110, the automatic recording system 10 is powered on and the remote device 16 is placed in close proximity to camera 46. For example, remote device 16 may be held above camera 46. In step 120, the common location of camera 46 and of remote device 16 is determined using GPS unit 22 associated with remote device 16. This information is transmitted to CPU 30 of base station 18 in step 130 where it is stored as the location of the camera (step 140). Next, the user—with remote device 16—moves away from camera 46 (step 150). The user preferably moves at least the minimum distance determined by the desired precision as noted in the discussion above. Once the user is a sufficient distance from camera 46, a feedback signal may be used to alert the user whether or not the user should proceed to the next step, or the user may count steps taken or estimate the distance in any other way he or she chooses. If the user is not far enough from camera 46, then step 150 is repeated until the distance condition is satisfied (step 160). Once satisfied, the process may continue. In step 170, the user finds the position where remote unit 16 is at or near the center of field of view 60 of camera 46. There are multiple ways this may be accomplished. Refer at least to FIGS. 6, 7, 8, and 11, their related discussion, and further descriptions below.

Once the user is satisfied that his or her position is appropriate (step 180), the location of remote device 16 is saved (step 190). The saved locations of camera 46 (see step 140) and remote device 16 are then used to compute an initial camera angle in an ECEF coordinate system. At this point, automatic recording system 10 is initialized and recording may proceed.

Figure 14:
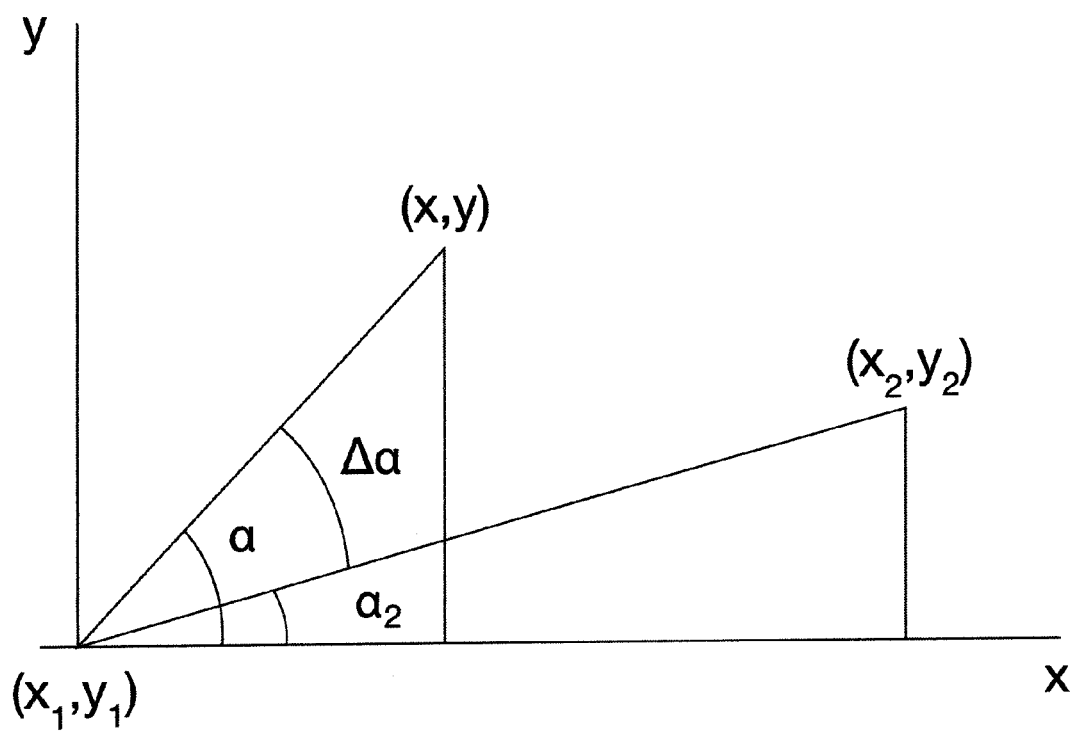
FIG. 14 shows a diagram illustrating the relationship between an initial determined reference angle and the angle determined for a subject that has moved.

FIG. 14 shows a diagram illustrating the relationship between an initial determined reference angle and the angle determined for a subject that has moved. With reference to FIG. 13, the location of the camera 46 is obtained and stored (steps 110, 120, 130, and 140); this location is denoted in FIG. 14 as $(x_1, y_1)$. Later in the setup procedure illustrated in FIG. 14, the location of remote device 16 determined at a distance away from camera 46 (step 190); the location of remote device 16 at this time is denoted as $(x_2, y_2)$. With this information, the angle $\alpha_2$ may be calculated in a predetermined (ECEF) coordinate system x,y. As video recording proceeds and as subject 12 moves, subject 12 will be at new locations. For example, subject 12 may be at a new location denoted as (x,y). The corresponding orientation of the camera may be calculated as the angular change $\Delta\alpha$. To compute the angular change, $\alpha_2$ is set to zero and all subsequent turning angles are computed with reference to this original orientation. It should be noted that while the x,y notations suggest Cartesian coordinates, other coordinate systems may be used.

One method of computing the angles illustrated in FIG. 14 would use a formula that first calculates distance per degree for the latitude and longitude location obtained from the GPS units, converts the locations defined by latitude and longitude into Cartesian coordinates, and then uses geometric relationships to arrive at the desired result. The conversion to Cartesian coordinates may also take into account the ellipsoidal shape of the earth and altitude data as well. However, for most the systems and methods of the present invention, this method is unnecessarily complex. In the systems and methods of the present invention, the distances between the camera and the remote device are very small compared to the distances computed as intermediate data. When the result of a calculation is a small number that is obtained as a difference of large numbers, very small relative errors in the large numbers can cause significant errors. This is remedied by using numbers with ten significant digits.

Another method uses a simpler approach and computes the angles in a more direct manner. For example, the calculation of the angular change may be done using the following formula:

$$\Delta\alpha = \alpha - \alpha_2 = \arctan\frac{y - y_1}{x - x_1} - \arctan\frac{y_2 - y_1}{x_2 - x_1}$$

The formula is substituted with $x_i = RA_i$ and $y_i = RB_i \cos A_i$, where R=6370 kilometers (corresponding to the radius of the Earth in spherical approximation), A stands for latitude, B stands for longitude, and i stands for 1 or 2 as necessary. This formula would perform poorly if it were used for the determination of the location of any of the system's components on the Earth, but works perfectly well for calculating the relative positions of the components of automatic recording system 10 and, therefore, also for the angle between them.

One preferred method of determining the initial direction of the camera during the setup procedure (step 170 in FIG. 13) is making use of the setup light source illustrated in FIG. 11 as follows. Positioner 32 preferably has a marker or indicator that designates the front of positioner 32. Camera 46 is mounted on positioner 32 such that the optical axis of camera 46 is positioned in a way that corresponds to the marker or indicator or the camera is otherwise integrated into the system in a manner which accomplishes this orientation requirement. The relative positions of positioner 32 and camera 46 are fixed. After the location of camera 46 has been determined and saved, the user moves away from the camera to an appropriate distance and finds point A (see FIG. 11) by visually assessing the transition in the visibility of the light source 260. Alternatively, a light sensing instrument, such as, for example, a photodiode, may be employed to find point A automatically.

In an alternate embodiment, light source 260 is preferably collimated. Collimated light beam 270 is parallel to pointing vector 48. The user may now accomplish step 170 by finding the area of highest light intensity. Again, light sensors, such as photodiodes, may be used to further automate step 170.

Another alternative method to accomplish step 170 is to position remote device 16 away from camera 46 at a distance determined by the required precision (steps 150 and 160). Next, camera 46 is turned manually or through control commands until remote device 16 is in the center of the camera's field of view 60. Pushing a function (setup or initialize) button on base station 18 or on remote device 16 now tells CPU 30 that camera 46 is oriented toward the remote device 16 (step 190) and saves remote device's location coordinates for establishing the reference orientation.

In another alternative embodiment, remote device 16 is equipped with a display. Pictures of footage taken by the camera will be shown on the display in real time. Further, the remote device may have controls that cause camera 46 to turn in different directions. The user, after putting sufficient distance between him or her and camera 46 (step 160), may direct the camera 46 to turn until he or she is found properly centered in the picture or footage displayed on the remote device.

Figure 15:
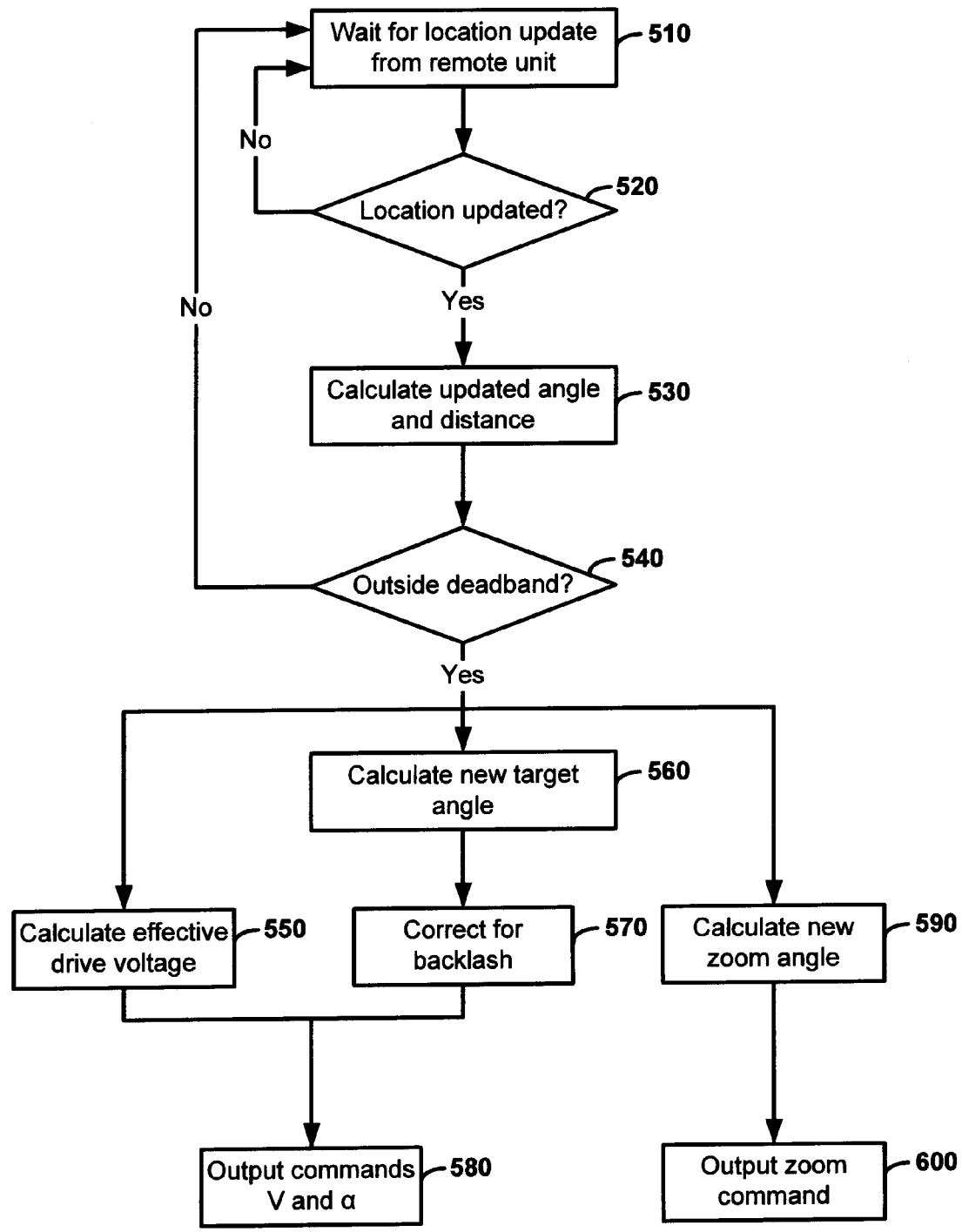
FIG. 15 shows a flowchart illustrating an automatic recording method according to a preferred embodiment of the present invention.

FIG. 15 shows a flowchart illustrating an automatic recording system method according to a preferred embodiment of the present invention. More particularly, FIG. 15 illustrates the process used to generate movement commands to move positioner 32. In step 510, CPU 30 then determines whether or not the location of the remote device has been updated. CPU 30 waits until the location of the remote device has been updated.

If the wait exceeds a predetermined amount of time or is too long, the positioner command output returns camera 46 to the last detected position of subject 12. Here "too long" may be defined, for example, as missing two to ten consecutive updates or about 500 milliseconds to 2.5 seconds if the normal updating frequency is five Hertz.

Next, in step 530, the updated location coordinates are recalculated in terms of angular orientation of camera 46. In subsequent step 540, the difference of the updated and previous orientations is compared to a deadband to decide whether the change in the orientation warrants camera movement. As an example, if the angular change is less than about 0.1 degrees, the camera does not move. This feature prevents unnecessary small movements that could result in video that stutters. To further illustrate this concept, if subject 12 is a speed skater and the remote device 16 is attached to his or her arm, left to right arm swings would occur nearly every second. It would be very unpleasant to watch a video in which the camera follows these arm swing movements. If subject 12 moves outside of the deadband, an effective driving voltage is computed as shown in step 150. Proportional-integral-derivative methods (PID methods) may be applied in this step. The effective driving voltage is preferably proportional to the angle between the new target angle and current camera orientation. Alternatively, a deadband may be accomplished using some or all of the angular latency due to gearbox backlash as described above.

The new camera angle is calculated in step 560 (the angle calculated in step 530 is one input for the calculation in step 560). At velocities that exceed a particular limit, it is expected that the camera movement lags substantially behind subject 12. To correct for this lag, a subsequent position may be predicted based on the last two, three, or more angular positions. This can be predicted using velocities and accelerations computed based on the last three or more data points.

Returning to step 550, after the location update is received, the driving voltage applied will be higher (and the camera movement will be faster) if the angular change is greater. If the camera orientation has been lagging, the camera movement will be even faster. The voltage is calculated as V=K·(camera angle−target angle), where K is a proportionality constant. V is preferably updated frequently. For example, if the target angle is updated at five Hertz, V may be updated at 200 Hertz.

When camera 46 gets close to the target orientation, the movement preferably slows to avoid overshooting. The edge of the deadband may be recalculated when the subject moves past the deadband boundary. The deadband may move slower than the target in some circumstances so that even moderate movement in the same direction moves the camera and similar movement in the reverse direction does not. This approach reduces unnecessary camera movements and the jitteriness of the recording to a significant extent. A mechanical deadband is also capable of achieving this.

While the application of using voltage to control motor speeds is generally straightforward, alternative methods may be utilized. For example, pulse width modulation may be applied either alone or in combination with adjusting the voltage. Other control approaches may be employed in different embodiments of the invention depending on the type of motors used in the positioner to orient the camera. For example, the velocities of stepper motors may be controlled by adjusting the time interval between step or microstep commands. Open loop control, which eliminates the need for an encoded wheel, may also be used by keeping track of step count and direction.

In step 570 the target angle is modified based on the known or estimated backlash of the driving motor and gearbox. See FIG. 10 and the accompanying discussion for more detailed information concerning backlash compensation. In step 580 the effective voltage and target angle are output to the positioner as there are two command parameters regulating a motor as, for example, a pan drive. In embodiments where multiple drives are available, each drive receives commands that result from similar processing. CPU 30 may also deliver drive signals directly to the camera so that the zoom, and therefore the field of view, is adjusted. Such adjustment will depend on the distance between the camera and the subject, the velocity of the subject, or whether the signal about the subject's location is available or has been missing for a period of time.

The backlash and deadband feature have similar effects on camera movement in that both instances there is a change in the angular position of the subject that does not immediately translate to camera movement. Knowing this, one embodiment of the present invention may include a backlash compensation value set to be less than the true angle of backlash. This creates a "mechanical deadband" which is equal to the true backlash angle minus the programmed backlash angle. In another embodiment of the present invention, both the deadband feature and the backlash compensation are eliminated. In yet another embodiment of the present invention, a "negative deadband" feature is implemented by setting the deadband value to be negative. In this embodiment, the camera leads the moving target by the absolute value of the negative deadband. This is desirable in applications in which the subject does not change directions frequently. The value of the negative deadband could also be a function of velocity and/or acceleration of the subject.

In another embodiment of the invention, the backlash compensation value is programmed to be a larger value than the true backlash value. In this embodiment, the camera leads the moving target by the difference between the programmed backlash value and the true backlash value. The value of backlash could be a function of the target's velocity and/or acceleration. For example, if the target changed direction and was moving quickly in the new direction, the value of backlash compensation could be calculated to be a larger value so that the camera catches up to the target more quickly. This is advantageous in applications where the target changes directions frequently and moves fast. After the subject has moved in one direction, a change of direction may result in drastic lagging of the camera behind the subject. Backlash overcompensation and negative deadband are similar in their effect to predict a location for the subject that is further along the direction of current movement.

In another embodiment, the camera angle intentionally lags behind the current target angle. The amount of lag time should be at least equal to the time between target location updates. For example, if the positioner receives updated target location information at a rate of 5 Hertz, then the camera should lag behind the target by at least 200 milliseconds. The advantage of this embodiment is that new target location information is available before the camera reaches the most current target data point allowing for smoother panning velocity to be achieved.

It is noted that the embodiments described with respect to backlash correction could be used individually or in combination.

In a preferred embodiment of the present invention, orientation controller 70 may be equipped with a number of security features. For example, the system may contain an accelerometer that is turned on when the initialization or set up is completed and turned off by the user at the end of a recording session. The accelerometer senses vertical movement of the orientation controller 70 that would occur if it was stolen. When the accelerometer senses the vertical movement, the user is preferably alerted by, for example, an alarm which may be audible, visual, or both. For example, status indicator LED 84 on the remote device 16 (see FIG. 3) may begin flashing to alarm the user. The orientation controller 70 is also preferably equipped with a mechanical fastener that connects it to an auger secured in the ground as well as with a lock that secures the camera 46 to the auger. Additionally, for those embodiments which have a GPS sensor associated with the camera, the orientation controller, base station, or positioner, the location of the orientation controller may be traced using the GPS sensor or could be used to detect theft when the GPS unit detects a location that is outside the error bubble of the camera location determined during initialization.

According to another embodiment of the present invention, a single positioner and a single camera may be used to track multiple remote devices. For example, at a sporting event, multiple subjects may be within the camera view. An optimal direction for the camera may be computed based on the locations of the multiple remote devices and the location of the camera so that multiple targets appear within the field of view of the camera. Additionally, an appropriate zoom may be combined with the computed optimal direction to maximize the number of targets appearing in the field of view of the camera. A process is preferably employed in which the positioner moves the camera to capture all of the multiple targets in its field of view if possible. If not all targets are able to be captured in the camera's field of view, some of the targets are selected. In such an embodiment, a selection of the targets must be made. The selected target or targets may be determined by several alternative methods including the following:

(1) Maximizing the number of targets able to be captured in the field of view at a preset minimum zoom.

(2) Using a hierarchy of targets. For example, a target may be designated as a "primary" target. The "primary" target is tracked. When additional targets are in the vicinity of the "primary" target, the system adjusts orientation and/or camera zoom to capture both the "primary" target and nearby secondary target(s). Alternately, the "primary" target may be tracked when possible. If the primary target cannot be tracked (e.g., because the signal from its remote device is missing), then a secondary target is tracked. This method is applicable for multiple ranked targets as well.

(3) Selecting targets for tracking based on attributes of their movement. For example, one selection scheme may be based on target velocity such that the target with the highest detectable speed is tracked. This method is applicable, for example, when multiple surfers are in the ocean, wearing remote devices that communicate with the same base station. The surfer who moves the fastest will be tracked. According to another embodiment, targets moving faster than a preset minimum speed are tracked. For example, the system may track a surfer moving faster than a particular speed (and likely to be riding a wave) over a surfer who is relatively stationary. According to another embodiment, multiple cameras may be set up along a path for recording a single target that moves large distances. In such an embodiment, an appropriately configured base station serves all positioners and cameras. Further, the base station is not collocated with all or with any of the positioners and cameras. The positions and initial orientations of each camera are determined during a setup procedure that is appropriately modified from the setup method described for a single positioner embodiment (see, for example, FIG. 13 and the accompanying discussion). Each positioner also incorporates a transceiver to receive commands and provide feedback. The positioners may also be equipped with GPS units which makes the setup procedure more efficient. The GPS equipped positioners transmit their location coordinates to the base station.

In another embodiment of the invention, the automatic video recording system comprises multiple remote devices and multiple positioners and cameras. For example, a series of cameras may be set up along a downhill ski run, a golf course, or other venue. Additionally, multiple subjects have their own associated remote devices. The location coordinates, initial orientation, and field of view of each camera are determined during setup. A base station sends commands to each positioner and camera to follow and to record targets as they appear in each camera's field of view. The methods described below for the case of a single camera and multiple targets are applied for target selection for each camera.

In another embodiment, automatic recording system may be equipped with GPS units programmed such that the remote device(s) and base station recognize which satellites they receive signals from at a particular point of time. The list of satellites may be compared and the largest common set of satellites may be used to compute location based on the data received from the largest common set of GPS satellites. For example, for GPS units A and B, GPS unit A may have received signals from satellites 1, 2, 3, 4, 5, 6, and 7; GPS unit B may have received signals from satellites 3, 4, 5, 6, 7, 8, 9, and 10. The largest common set of satellites is satellites 3, 4, 5, 6, and 7. The largest common set of satellites may vary every time data from satellites are refreshed.

In another embodiment, the orientation controller incorporates an array of two or more directional receivers, such as antennae or microphones, oriented in different directions and the remote device transmits signals (electromagnetic or sound signals) corresponding to the receiver types. The direction of the remote device with respect to the orientation controller may be determined from the strengths of the signals received by the receivers at the orientation controller. In an embodiment utilizing sound signals, and since the frequency of the transmitted signal would be known, the Doppler shift may be used to determine if the remote device is moving closer or farther from the camera. The information obtained may be used either as a replacement of GPS sensors or in addition to GPS technology. GPS technology has distinct advantages outdoors. In those circumstances where GPS signals may not be available (e.g., indoors or between buildings), electromagnetic or sound signal orienting may be used. These technologies may also be used in combination with the GPS technology.

In another embodiment of the automatic recording system, the orientation controller preferably comprises an electromagnetic frequency sensor, for example a charge-coupled device. A charge-coupled device detects an electromagnetic waveform that is emitted by the remote device. The electromagnetic waveform emitted by the remote device could be a specific frequency. Other electromagnetic radiation that is not emitted by the remote device is preferably filtered out. The charge-coupled device is preferably optimized to only detect the frequency or frequencies emitted by the remote device. Using a charge-coupled device as a position sensitive detector permits the direction of the remote device to be determined so that the camera may be oriented automatically at the target.

Available technology permits using touch sensors and voice commands to activate (turn on) and generally communicate with electronic devices such as the remote device. Such commands may also be easily transmitted to a base station. Use of such technology may be utilized in embodiments of the invention.

Different preferred embodiments, methods, applications, advantages, and features of this invention have been described above; however, these particular embodiments, methods, applications, advantages, and features should not be construed as being the only ones that constitute the practice of the invention. Indeed, it is understood that the broadest scope of this invention includes modifications. Further, many other applications and advantages of applicant's invention will be apparent to those skilled in the art from the above descriptions and the below claims.

What is claimed is:

1. A portable automated video recording system for automated orientation of a camera to point at a freely moving target for recording high quality video, said system comprising:
   a) a positioner configured to orient the camera in angular increments of less than about 0.1 degrees;
   b) a remote unit configured to obtain location information and comprising a transmitter configured to transmit said location information; and
   c) a base station comprising a receiver to receive said location information from said remote unit and configured to determine turning angles to orient the camera at the freely moving target and driving voltages to regulate the velocity of the orienting by said positioner; and
   d) location information received by said base station when said remote unit is collocated with the camera is stored and used as the location of the camera by said base station; and
   e) said base station is further configured to command said positioner to orient the camera at the freely moving target using location information received from said remote unit when said remote unit is collocated with the freely moving target and the location of the camera received by said base station when said remote unit is collocated with the camera; and
   f) an enclosure to house said base station and said positioner, said enclosure further comprising at least one feedback device that provides feedback to the freely moving target regarding the orientation of the camera and that is also oriented by said positioner at the freely moving subject along with the camera as the freely moving subject moves.

2. The system of claim 1 further comprising a mounting base to support said positioner.

3. The system of claim 1, wherein said at least one feedback device comprises at least one light source.

4. The system of claim 1, wherein said at least one feedback device comprises at least one collimated light beam.

5. The system of claim 1, wherein said positioner comprises at least one motor wherein each of said at least one motor is associated with a gearbox, said gearbox comprising a driving shaft and a driven shaft that orients the camera and said gearbox reduces the angular velocity of the driven shaft, and said driven shaft and said driving shaft are each associated with an encoded wheel to assist determining the orientation of the camera.

6. The system of claim 1, wherein said remote unit comprises a sensor to receive signals from components of a global positioning system.

7. The system of claim 1, wherein the velocity with which the camera turns is dependent on changes in the location of the subject.

8. The system of claim 1, wherein said base station also controls the zoom of the camera.

9. The system of claim 1, further comprising at least one driving mechanism to turn the camera and a backlash compensator for each driving mechanism to effect smooth turning of the camera.

10. The system of claim 9, wherein said at least one driving mechanism comprises a driving shaft and a driven shaft and wherein said backlash compensator comprises at least two encoded wheels, wherein at least one of said at least two encoded wheels is associated with said driving shaft and at least one of said at least two encoded wheels is associated with said driven shaft of said at least one driving mechanism.

11. The system of claim 10, wherein said backlash compensator operates with a set backlash value.

12. The system of claim 10, wherein said backlash compensator determines backlash every time when the system is powered up.

13. A method of automatically following a freely moving target with a camera to record high quality video, said method comprising the steps of:
   a) setting up a camera associated with a positioning device, the positioning device configured to orient the camera with an angular resolution of at least about 0.1 degrees;
   b) collocating a remote unit that obtains location information with the camera and storing location information obtained as the location of the camera;
   c) moving the remote unit to a location away from the camera such that the remote unit is at or near the center of the field of view of the camera and storing the location of the remote unit;
   d) determining an initial pointing angle of the camera using the stored location of the camera and the stored location of the remote unit;
   e) periodically receiving signals relevant to the location of the remote unit associated with the freely moving target and transmitting information related to the location of the remote unit to the positioning device;
   f) periodically determining turning angle values for orienting the camera to remain pointed at the remote unit based in part on the initial pointing angle of the camera and computing values for driving voltages for the positioning device;
   g) commanding the positioning device to orient the camera using the computed driving voltages to regulate the velocity of the orienting; and
   h) providing a collimated light beam that has an edge that substantially coincides with an axis of the camera that corresponds to a pointing direction of the camera and moving the remote unit with the aid of the collimated light beam to assist the step of locating the remote unit near the center of the field of view of the camera prior to the step of determining the initial pointing angle of the camera using the stored location of the camera and the stored location of the remote unit.

14. The method of claim 13, further comprising the steps of
   a) determining whether movements of the freely moving target warrant commanding the positioning device to orient the camera based on the determined turning angle and velocity values if the determined turning angle and velocity values are outside of a designated deadband; and
   b) only commanding the positioner to orient the camera if the determined turning angle and velocity values are outside of the designated deadband.

15. The method of claim 14, wherein the deadband may be zero or negative.

16. The method of claim 13, further comprising the steps of
   a) locating the remote unit away from the camera at a distance dependent on the desired precision of the orientation of the camera; and
   b) locating the remote unit near the center of the field of view of the camera.

17. The method of claim 13, further comprising the step of orienting the camera at the remote unit to effect the step of locating the remote unit near the center of the field of view of the camera.

* * * * *